United States Patent
Hankinson et al.

(10) Patent No.: US 11,074,274 B2
(45) Date of Patent: Jul. 27, 2021

(54) LARGE SCALE SOCIAL GRAPH SEGMENTATION

(71) Applicant: AFFINIO INC., Halifax (CA)

(72) Inventors: Stephen James Frederic Hankinson, Hammonds Plains (CA); Timothy Andrew Burke, Halifax (CA)

(73) Assignee: AFFINIO INC., Halifax (CA)

( * ) Notice: Subject to any disclaimer, the term of this patent is extended or adjusted under 35 U.S.C. 154(b) by 337 days.

(21) Appl. No.: 16/097,364

(22) PCT Filed: May 2, 2017

(86) PCT No.: PCT/CA2017/000109
§ 371 (c)(1),
(2) Date: Oct. 29, 2018

(87) PCT Pub. No.: WO2017/201605
PCT Pub. Date: Nov. 30, 2017

(65) Prior Publication Data
US 2019/0146981 A1    May 16, 2019

Related U.S. Application Data

(60) Provisional application No. 62/331,137, filed on May 3, 2016.

(51) Int. Cl.
*G06F 16/00* (2019.01)
*G06F 16/28* (2019.01)
(Continued)

(52) U.S. Cl.
CPC ........ *G06F 16/285* (2019.01); *G06F 16/2379* (2019.01); *G06K 9/6226* (2013.01);
(Continued)

(58) Field of Classification Search
CPC ... G06F 16/285; G06F 16/2379; G06Q 50/01; G06Q 10/10; G06K 9/6226; G06K 9/6272
See application file for complete search history.

(56) References Cited

U.S. PATENT DOCUMENTS 6,438,579 B1    8/2002  Hosken
8,385,662 B1    2/2013  Yoon et al.
(Continued)

FOREIGN PATENT DOCUMENTS

| WO | 0106398    | 1/2001  |
| WO | 2010085874 | 8/2010  |
| WO | 2017214703 | 12/2017 |

OTHER PUBLICATIONS

Lindsay Kolowich, "How the News Feed Algorithms Work on Facebook, Twitter & Instagram". Apr. 14 2016 (Apr. 14 2016), <https://web.archive.org/web/20161118231817/http://blog.hubspot.com:80/marketing/how-algorithm-works-facebook-twitter-instagram#sm.000009mhet3y28f32ugb612o3096a>.
(Continued)

*Primary Examiner* — Jared M Bibbee
(74) *Attorney, Agent, or Firm* — IP-Mex Inc.; Victoria Donnelly

(57) ABSTRACT

A method of complementary clustering of a vast population of objects is disclosed. The method aims at maximizing a global measure of object affinity within naturally-formed clusters. A first clustering procedure produces primary centroids of clusters of objects and a second clustering procedure produces secondary clusters of the primary centroids and corresponding secondary centroids. Refined clusters of the population of objects are formed based on object proximity to the secondary centroids. The first clustering procedure is preferably based on a variation of the K-means method, and the second clustering procedure is preferably
(Continued)

based on the Density-Based Spatial Clustering of Applications with Noise (DBSCAN). An apparatus implementing the method is devised to facilitate conflict-free parallel processing.

23 Claims, 30 Drawing Sheets

(51) Int. Cl.
    *G06Q 50/00*     (2012.01)
    *G06Q 10/10*     (2012.01)
    *G06K 9/62*     (2006.01)
    *G06F 16/23*     (2019.01)

(52) U.S. Cl.
    CPC ........... *G06K 9/6272* (2013.01); *G06Q 10/10* (2013.01); *G06Q 50/01* (2013.01)

(56) References Cited

U.S. PATENT DOCUMENTS

| | | | |
|---|---|---|---|
| 8,489,515 | B2 | 7/2013 | Mathur |
| 9,183,285 | B1 | 11/2015 | Brown et al. |
| 9,286,391 | B1 | 3/2016 | Dykstra et al. |
| 9,348,886 | B2 | 5/2016 | Arnoux et al. |
| 10,095,771 | B1 | 10/2018 | Dykstra et al. |
| 10,152,549 | B1 | 12/2018 | Vanderwater et al. |
| 10,325,289 | B2 | 6/2019 | Koran |
| 10,657,559 | B2 | 5/2020 | Sinha et al. |
| 2002/0194058 | A1 | 12/2002 | Eldering |
| 2003/0074369 | A1* | 4/2003 | Schuetze ............... G06F 16/355 |
| 2004/0249774 | A1 | 12/2004 | Caid et al. |
| 2005/0159996 | A1 | 7/2005 | Lazarus et al. |
| 2007/0217676 | A1* | 9/2007 | Grauman ............. G06K 9/6212 382/170 |
| 2011/0208709 | A1* | 8/2011 | Holthausen ........... G06F 16/951 707/706 |
| 2012/0254184 | A1 | 10/2012 | Choudhary et al. |
| 2013/0046772 | A1 | 2/2013 | Gu et al. |
| 2013/0124298 | A1 | 5/2013 | Li et al. |
| 2013/0262465 | A1 | 10/2013 | Galle et al. |
| 2014/0089048 | A1 | 3/2014 | Bruich |
| 2014/0257990 | A1 | 9/2014 | Cudgma |
| 2014/0278799 | A1 | 9/2014 | McLean |
| 2014/0278930 | A1 | 9/2014 | Brixius et al. |
| 2014/0354649 | A1 | 12/2014 | Aksu et al. |
| 2015/0100587 | A1 | 4/2015 | Walkingshaw et al. |
| 2015/0106444 | A1 | 4/2015 | Schneider et al. |
| 2016/0042372 | A1 | 2/2016 | Herman et al. |
| 2016/0071162 | A1 | 3/2016 | Ogawa et al. |
| 2016/0076908 | A1* | 3/2016 | Pang ..................... H04W 4/029 701/494 |
| 2016/0140623 | A1 | 5/2016 | Gupta et al. |
| 2016/0156945 | A1 | 6/2016 | Romrell et al. |
| 2016/0328748 | A1 | 11/2016 | Koran |
| 2017/0091471 | A1 | 3/2017 | Su et al. |
| 2017/0142481 | A1 | 5/2017 | Caruana et al. |
| 2017/0213242 | A1 | 7/2017 | Sundaram et al. |

OTHER PUBLICATIONS

Beel et al., " Mr. DLib: Recommendations-as-a-Service (RaaS) for Academia", 978-1-5386-3861-3/17/$31.00, 2017, IEEE.

Jang et al., "DBSCAN++: Towards fast and scalable density clustering," archive of Cornell University: arXiv:1810.13105 [cs.LG] Oct. 2018 <https://arxiv.org/abs/1810.13105>.

Roughgarden et al., "The Complexity of the k-means Method,"24th Annual European Symposium on Algorithms (ESA 2016), Dagstuhl Research Online Publication Server citation: 10.4230/LIPIcs.ESA. 2016.78 <https://drops.dagstuhl.de/opus/volltexte/2016/6419/pdf/LIPIcs-ESA-2016-78.pdf>, Aug. 2016, article No. 78, pp. 78:1-78:14.

Beel et al., "Mr. DLib: Recommendations-as-a-Service (RaaS) for Academia", 978-1-5386-3861-3/17/$31.00, Jun. 2017, IEEE.

Fred et al., "Learning Pairwise Similarity for Data Clustering", 18th International Conference on Pattern Recognition (ICPR'06), 2006, vol. 1, pp. 925-928.

Burke, "Hybrid Recommender Systems: Survey and Experiments", User Modeling and User-Adapted Interaction, Nov. 2002 (Nov. 2002), vol. 12(4), pp. 331-370.

* cited by examiner

LARGE SCALE SOCIAL GRAPH SEGMENTATION

FIELD OF THE INVENTION

The present invention relates to clustering of a large number of objects. In particular, the invention is directed to segmentation of a social graph representing a large number of tracked users of social networks.

BACKGROUND

One of the most popular methods of population segmentation is the so-called K-means method. Several variations and extensions of the method are disclosed in the literature. It is well known that, except for a population of objects of a relatively small membership, finding a global optimal segmentation of a large number of objects, exceeding 10000 for example, may require prohibitively extensive computational effort. Using the K-means method with a predefined objective function, an attained segmentation of a population under consideration into K clusters, K being a specified integer exceeding unity, corresponds to a local minimum of the objective function. The steady-state solution, i.e., the resulting segmentation pattern, depends on a selected number K of clusters and selected initial values of K centroids.

In a social network graph, there are many naturally forming clusters of individuals with similar interests or traits. Several methods of identifying the most relevant naturally forming communities (clusters) in a large multi-dimensional social graph are known. However, there is a need to investigate methods for improving clustering techniques.

SUMMARY

A novel complementary clustering method which combines advantages of two clustering procedures is disclosed. The first procedure is based on a variation of the popular K-means method, and the second procedure is based on the Density-Based Spatial Clustering of Applications with Noise (DBSCAN). The first procedure is applied to a population of objects to produce primary clusters of objects and corresponding primary centroids. The second procedure is applied to the primary centroids to produce secondary clusters of primary centroids and corresponding secondary centroids. Refined clusters of population of objects are then determined based on the secondary centroids. The method aims at maximizing a global measure of object affinity within naturally-formed clusters.

In accordance with an aspect, the invention provides a method of clustering of a plurality of objects. The method comprises processes of acquiring and storing a plurality of vectors of object descriptors, seeded clustering of the plurality of objects, autonomous clustering of primary centroids resulting from seeded clustering to produce a set of secondary clusters, and associating each object with one of the secondary clusters.

Each vector of object descriptors characterizes a respective object of the plurality of objects. The process of seeded clustering uses the plurality of vectors of object descriptors and a first affinity measure to produce a plurality of primary centroids characterized by a corresponding plurality of vectors of primary descriptors. The process of autonomous clustering segments the plurality of primary centroids using the plurality of vectors of primary descriptors and a second affinity measure to produce a set of secondary centroids. Finally, each object is associated with one of the secondary centroids according to the second affinity measure to produce refined clusters of the plurality of objects.

The first affinity measure may be based on angular displacement of each object from each primary centroid. Alternatively, the first affinity measure may be based on Euclidean distance between each object and each primary centroid. The second affinity measure may be based on object density defined as a number of primary centroids within a hypersphere of a predefined radius.

The seeded-clustering process may be performed according to an angular K-means clustering process. Alternatively, the seeded-clustering process may be performed according to a Euclidean K-means clustering process.

The autonomous clustering may be performed according to a process of Density-Based Spatial Clustering of Applications with Noise (DBSCAN) based on specified values of density parameters $\{\Pi, R\}$, where $\Pi$ is a specified minimum number of primary centroids within a hypersphere of radius $R$.

Rather than specifying a relatively large number of clusters for the seeded clustering process, which may lead to clusters containing relatively small numbers of objects, the process of seeded clustering may be run M times, $M>1$, with a judicially selected number K of clusters and different sets of K primary centroid seed vectors. The resulting K primary centroids of each of the M runs are merged to form a superset of M×K primary centroids. Thus, the seeded clustering process comprises steps of: generating a superset of M×K mutually-distinct seed vectors of primary descriptors of the plurality of primary centroids; and segmenting the plurality of objects into respective K clusters for each of M sets of K seed vectors. A primary centroid may be determined for each cluster according to a process of angular K-means clustering process. Alternatively, a primary centroid may be determined for each cluster according to a process of Euclidean K-means clustering process;

The resulting superset of M×K primary centroids is retained to be processed in a subsequent autonomous clustering process.

An implementation of the seeded clustering process according to an embodiment of the present invention comprises steps of:

(1) initializing each cluster of a plurality of clusters to contain a respective vector of centroid descriptors;
(2) determining a respective first affinity measure of each object to each cluster according to a vector of object descriptors of each object and the respective vector of centroid descriptors of the each cluster;
(3) assigning each object to a cluster of highest first affinity measure;
(4) upon assignment of all objects of the plurality of objects, updating each cluster's vector of centroid descriptors according to current assignment of objects to clusters; and
(5) repeating steps (2), (3), and (5) until a predefined completion criterion is attained.

An alternate implementation of the seeded clustering process according to an embodiment of the present invention comprises steps similar to steps (1) to (5) above except that updating a cluster's vector of centroid descriptors takes place after each assignment of an object to a cluster or, preferably, after assignment of a predefined number of objects to a cluster.

To acquire a set of K seed vectors, objects of the plurality of objects are indexed as 0 to $(N-1)$, N being a number of objects of the plurality of objects, and a set of K indices are generated as non-repeating randomly sequenced integers in the range of 0 to (N−1). The K vectors of object descriptors read from the memory device, corresponding to the K indices, are then used as K seed vectors. Each seed vector is associated with one of K clusters, K>1 and an angular K-means process is performed to determine K centroids of K clusters, K>1. The generated K centroids join a superset of centroids forming the plurality of primary centroids. Generating the set of K centroids is repeated (M−1) times using different sets of K seed vectors, M>1 to produce M×K primary centroids.

In accordance of the present invention, three methods may be use to select appropriate seed vectors to start a seeded clustering process.

According to a first method of seed selection, a lower bound and an upper bound of values of each descriptor may be determined; each vector of object descriptors represents a set of ν descriptors of different types, ν>1. K objects are randomly selected subject to a condition that for each of the selected K objects at least a predefined number of descriptors of the ν descriptors have values within the lower bound and upper bound. Vectors of object descriptors of the K objects may be used as the K seed vectors.

According to a second method of seed selection, the magnitude of each vector of object descriptors is determined and a cumulative normalized histogram of magnitudes of the vectors of object descriptors is generated. A lower bound and an upper bound of the magnitudes are determined according to predefined cumulative values $h_1$ and $h_2$, $h_1 < h_2 < 1.0$. K objects are then randomly selected subject to a condition that for each of the K objects the corresponding magnitude is within the lower bound and upper bound. The vectors of object descriptors of the selected K objects may be used as the K seed vectors.

According to a third method of seed selection, the angular displacement of each vector of object descriptors is determined. A cumulative normalized histogram of angular displacements of the vectors of object descriptors is generated. A lower bound and an upper bound of the angular displacements are determined according to predefined cumulative values $h_1$ and $h_2$, $h_1 < h_2 < 1.0$. K objects are then randomly selected subject to a condition that for each of the K objects the corresponding angular displacement is within the lower bound and upper bound. Vectors of object descriptors of the selected K objects may be used as the K seed vectors.

In accordance with another aspect, the invention provides an apparatus for clustering a plurality of objects. The apparatus comprises a processor and at least one memory device. One of the memory devices stores a plurality of vectors of object descriptors where each vector of object descriptors characterizes a respective object of the plurality of objects.

Processor-executable instructions, stored in at least one memory device, are organized into software modules including:
  (1) a first module for clustering the plurality of objects according to the plurality of vectors of object descriptors and a first affinity measure to produce a plurality of primary centroids characterized by a corresponding plurality of vectors of primary descriptors;
  (2) a second module for clustering the plurality of primary centroids according to the plurality of vectors of primary descriptors and a second affinity measure to produce a set of secondary centroids; and
  (3) a third module for producing refined clusters of the plurality of objects by associating each object of the plurality of objects with one of the secondary centroids according to the second affinity measure.

The first module is devised to cause the processor to generate M sets of K seed vectors of primary descriptors of the plurality of primary centroids, $M \geq 1$, $K > 1$. The first module may compute a plurality of normalized vectors of object descriptors, for use as input to an angular K-means clustering process, where each vector of the plurality of vectors of object descriptors is normalized to have a magnitude of unity. For each of the M sets of K seed vectors, the plurality of objects is segmented into respective K clusters. Corresponding K primary centroids are determined according to a process of angular K-means clustering process. The union of M sets of K primary centroids thus determined forms the plurality of primary centroids.

The seeded angular-K-means process determines content (object membership) of each primary cluster and corresponding normalized primary centroids. The normalized primary centroids may be submitted directly to an autonomous clustering module such as the second module which implements a DBSCAN process. Alternatively, a modified primary centroid may be generated for each primary cluster based on the object membership of the clusters and the plurality of vectors of absolute values of object descriptors.

The second module is devised to implement the Density-Based Spatial Clustering of Applications with Noise based on specified values of density parameters $\{\Pi, R\}$, where $\Pi$ is a specified minimum number of primary centroids within a hypersphere of radius R.

In accordance with a further aspect, the invention provides a system for clustering a plurality of objects. The system comprises a plurality of independent apparatus and a parameter generator for generating clustering parameters for each apparatus.

Each apparatus comprises a respective processor and at least one memory device storing processor-executable instructions organized into:
  (1) a first module for clustering a plurality of objects characterized by a plurality of vectors of object descriptors based on a first affinity measure to produce a plurality of primary centroids characterized by a corresponding plurality of vectors of primary descriptors;
  (2) a second module for clustering the plurality of primary centroids according to the plurality of vectors of primary descriptors and a second affinity measure to produce a set of secondary centroids; and
  (3) a third module for associating each object of the plurality of objects with one of the secondary centroids and determining a respective Global Affinity Index.

A selector is provided to determine which of the sets of secondary clusters determined at the different apparatus yields the highest Global Affinity Index.

The first module of each apparatus is configured to implement an angular K-means clustering process based on a predefined number K of clusters and corresponding seed vectors of primary descriptors. The angular K-means clustering process is exercised M times to produce the plurality of vectors of primary descriptors.

The parameter generator is configured to acquire for each apparatus:
  a respective number K of a set of primary centroids, K>1;
  a respective number M of process executions;
  a respective radius R of a hypersphere; and
  a respective minimum number $\Pi$ of primary centroids within the hypersphere of radius R; and
  M×K seed vectors of primary descriptors.

Parameters M and K, and the M×K seed vectors are directed to the first module, while parameters R and $\Pi$ are directed to the second module, of a respective apparatus.

The third module determines the Global Affinity Index according to deviation of each object of the plurality of objects from a respective secondary centroid.

In accordance with another aspect, the invention provides a method of clustering of a plurality of objects. The method comprises seeded clustering of the objects followed by parameterized clustering of centroids of clusters of objects. The seeded clustering of the plurality of objects produces a set of primary centroids. The parameterized clustering of the primary centroids produces secondary clusters and corresponding secondary centroids. The objects are then individually associated with respective secondary centroids based on proximity of each object to each secondary centroid. The outcome is a set of refined clusters of the plurality of objects.

In accordance with another aspect, the invention provides a system of segmenting a plurality of objects. The system comprises a network interface, a shared pool of processors, and storage media. A first shared-storage medium comprises a memory device storing descriptors of tracked-object and a memory device storing intermediate results, such as primary centroids. A second storage medium stores at least two software modules. One software module comprises processor-executable instructions which cause selected processors of the shared pool of processors to implement a seeded-clustering method. Another software module comprises instructions causing other selected processors of the shared pool of processors to implement a parameterized-clustering method. The second storage medium further stores a module comprising software instructions for determining refined clusters of the plurality of objects based on the secondary centroids. The first storage medium further comprises a memory device for storing the secondary centroids and the refined clusters.

BRIEF DESCRIPTION OF THE DRAWINGS

Embodiments of the present invention will be further described with reference to the accompanying exemplary drawings, in which.

TERMINOLOGY

Figure 1:
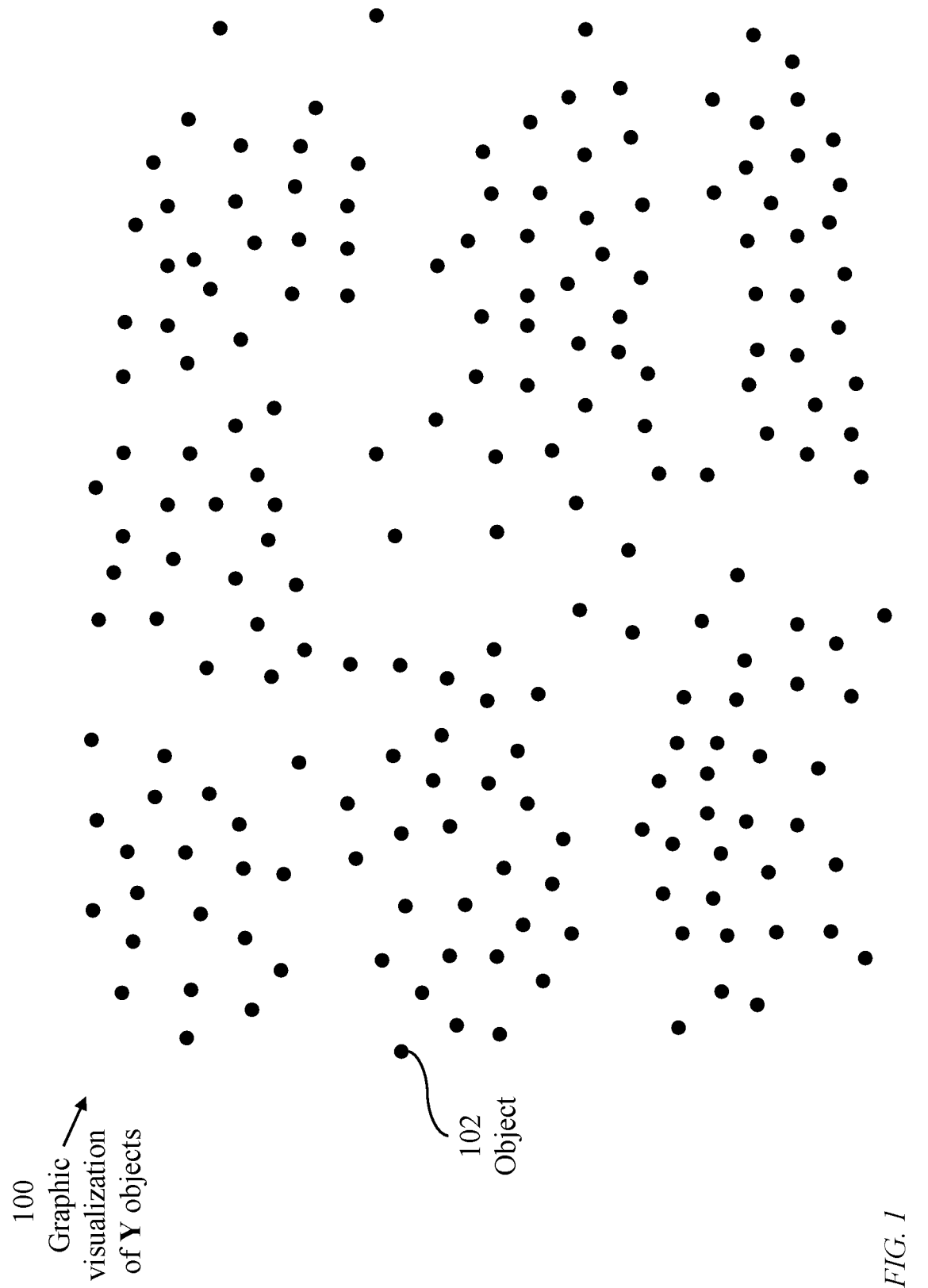
FIG. 1 illustrates a graphic visualization of a population of a large number of objects.

Neutral vector: A neutral (reference) vector of $v$ dimensions has the same value $\eta=v^{(-1/2)}$ in each dimension, $v>1$.

Mutually distinct vectors: Two vectors are mutually distinct if the magnitude of the difference between the two vectors exceeds a predefined threshold; centroid seed vectors used in seeded clustering must be pairwise distinct.

Forced clustering process: A forced-clustering process is a guided clustering process which starts with an imposed number K of clusters and corresponding seed vectors of centroid descriptors. The process assigns objects to the clusters and determines refined vectors of centroid descriptors.

Seeded clustering process: A seeded-clustering process is a forced-clustering process based on specified initial descriptors of a specified number of centroids. The K-means clustering process is a forced clustering process.

Autonomous clustering process: An autonomous-clustering process identifies clusters based solely on input data. If the autonomous clustering process is applied directly to tracked objects, the input data would be an array of vectors of object descriptors. In the two-stage clustering system of the present invention, the autonomous clustering module is applied to primary centroids of the tracked objects. Hence, vectors of primary-centroid descriptors constitute the input data of the autonomous clustering module.

Parameterized clustering process: A procedure of clustering based on aggregating objects according to parameters quantifying intrinsic characteristics of a population under consideration is herein referenced as a "parametric clustering" procedure. A parameterized clustering process based solely on objects' characteristics is an autonomous clustering process.

Updated centroid descriptors: A vector of centroid descriptors may be updated when new objects joint the corresponding cluster. The updated value may simply be the mean values of vectors representing the constituent objects of a cluster. Naturally this requires maintaining a running sum of the vectors of object descriptors for each cluster.

Global Centroid Shift: A Global Centroid Shift $\Delta_1$ is determined based on comparing updated descriptors of all centroids with corresponding previous descriptors. For example, the value of $\Delta_1$ may be determined as the mean value of the Euclidean distances between current and previous vectors of all centroids. The value of $\Delta_1$ may be also determined as the mean value of the dot products of current and previous normalized vectors of all centroids.

Global Affinity Index: The affinity measure of a first vector of descriptors with respect to a second vector of descriptors may be defined as the dot product of the two vectors, if the vectors are normalized, or the magnitude of the vector representing the difference. The Global Affinity Index is a normalized sum of the affinity measures of each object of the plurality of objects with respect to a respective centroid.

Global Affinity enhancement: The difference between successive values of computed Global Affinity Indices in an iterative procedure is a measure of enhancement (or otherwise).

DBSCAN: A well known clustering algorithm "Density-Based Spatial Clustering of Applications with Noise"

Object: An object is identified by a vector of object descriptors, each object descriptor corresponding to a property of the object. A descriptor may be represented as a numeric value or an index to a list of properties.

Population: Hereinafter, the term population refers to a plurality of tracked objects.

Clustering: A process of grouping objects based on descriptors of the objects is referenced as "clustering".

Segmentation: The terms "clustering" and "segmentation" are herein used synonymously.

Centroid: A hypothetical object whose vector of descriptors is a mean value of the vectors of descriptors of a set of objects is referenced as a "centroid". The mean value is not necessarily an arithmetic mean.

Seeded clustering: A procedure of clustering based on specified initial centroids is herein referenced as a "seeded clustering" procedure. A clustering method of the popular family of K-means clustering methods is considered a "seeded clustering" method.

Parameterized clustering: A procedure of clustering based on aggregating objects according to parameters quantifying intrinsic characteristics of a population under consideration is herein referenced as a "parametric clustering" procedure.

Steady state: In an iterative solution, a steady-state solution is realized when a specific criterion is satisfied; for example when a normalized difference between successive results is below a predefined threshold (such as 106), or when two successive iterations yields no object migration from one cluster to another.

NOTATION $G(\eta, j)$: A primary cluster of index $j$, $0 \leq j < K$, formed according to a seeded clustering method (FIG. 7) with a set of seed centroids of index $\eta$, $0 \leq \eta < X$, is denoted $G(\eta, j)$.

$\chi(\eta, j)$: $\chi(\eta, j)$ denotes a primary centroid of a primary cluster $G(\eta, j)$.

$\Gamma(\pi)$: $\Gamma(\pi)$ denotes a secondary cluster of index $\pi$, $0 \leq \pi < \lambda$.

Figure 14:
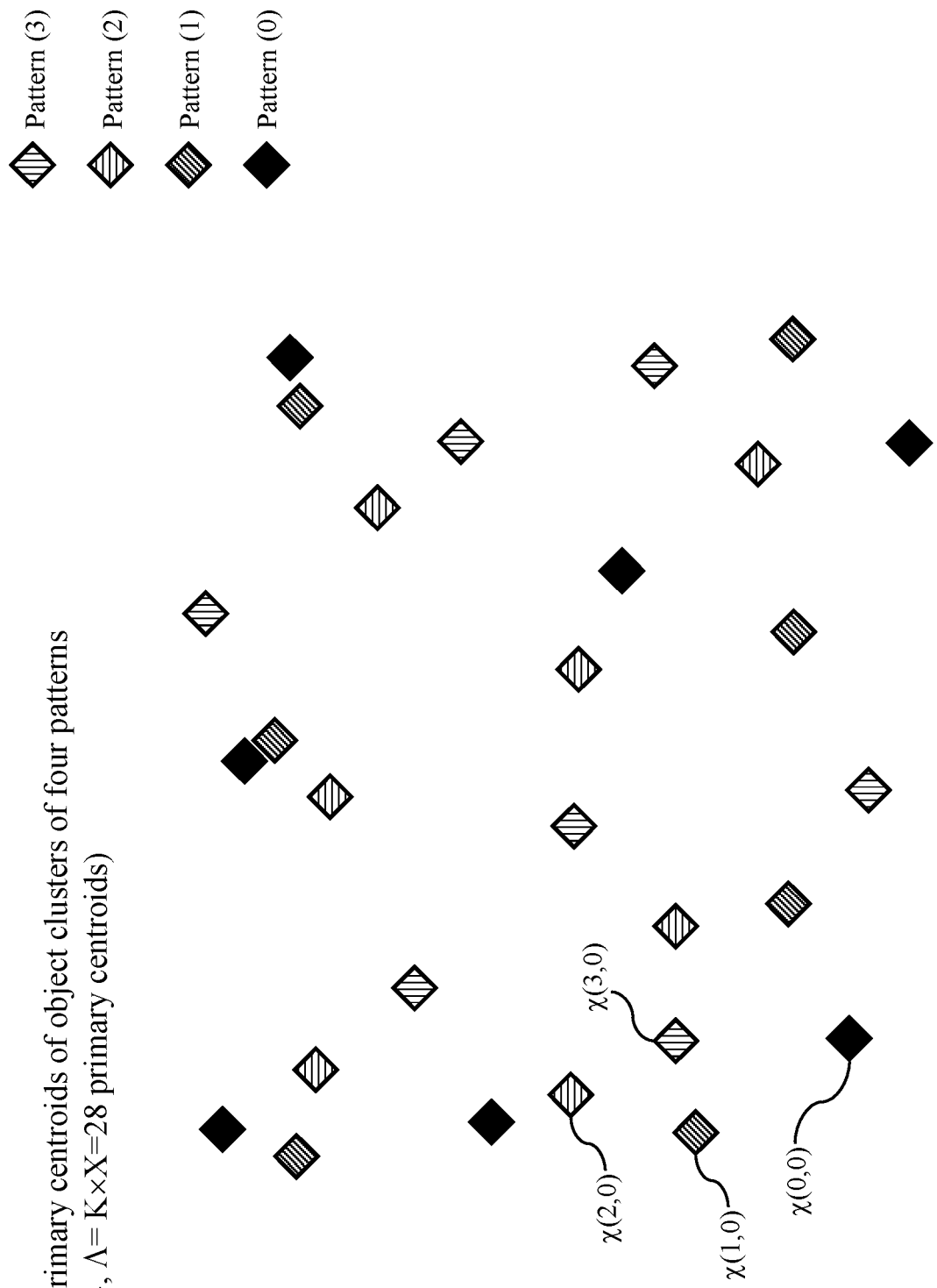
FIG. 14 illustrates a union of the primary centroids of FIG. 11 and FIG. 12, as well as primary centroids determined using a third set of K seeded initial centroids and a fourth sets of K seeded initial centroids.

$\Phi(\pi)$: $\Phi(\pi)$ denotes a secondary centroid of index $\pi$, $0 \leq \pi < \lambda$, (the $\lambda$ secondary centroids are determined from the $X \times K$ primary centroids; as illustrated in FIG. 14, there are $X \times K$ primary centroids $\{\chi(\eta, j), 0 \leq \pi < X, 0 \leq j < K\}$).

REFERENCE NUMERALS

100: Graphic visualization of a population of Y objects
102: An object
200: Seeded-clustering method
210: A process of generating a number K of seed centroids (initial centroids)
220: A process of proximity clustering
230: A process of updating K centroids
240: A process of determining deviation of a set of updated K centroids from a current set of K centroids
250: A process of determining whether the iterative seeded-clustering process has attained a steady-state
260: A process of continuing iterative determination of clusters based on updated K centroids
300: System for complementary clustering
310: Network interface
320: Shared pool of processors (e.g., cloud-computing facility)
340: Shared-storage media holding object-relevant data (e.g., within a cloud-computing facility)
342: Memory devices storing tracked-objects descriptors

344: Memory device storing primary centroids
360: Shared-storage media holding software instructions (cloud-computing facility)
362: Memory device storing software instructions pertinent to seeded clustering
364: Memory device storing software instructions pertinent to parameterized
400: An overview of a complementary clustering method
410: Stored descriptors of tracked objects (population objects under consideration)
420: A set of primary centroids
430: A set of secondary centroids
440: Data associating each object with a respective secondary centroid (or conversely identifying a cluster of objects associated with a secondary centroid)
500: A complementary-clustering method
505: Tracked-objects data
510: A process of seeded clustering of tracked objects
512: A set of primary centroids (centroids of initial clusters of objects)
520: A process of parameterized clustering of the set 512 of primary centroids to produce a set of secondary clusters
522: Set of secondary clusters (clusters of primary centroids)
530: A process of computing secondary centroids
532: Set of secondary centroids
540: A process of defining refined clusters based on the set of secondary centroids 532 and the tracked-objects data 505
600: Visualization of complementary-clustering processes
610: Plurality of objects 102
612: Process of generating $\Lambda$ primary clusters and corresponding $\Lambda$ primary centroids of Y objects under consideration
614: A process of proximity-based clustering
620: A set of $\Lambda$ primary clusters of objects based on X sets of K clusters ($\Lambda=X\times K$, $\Lambda\ll Y$)
622: Process of parameterized clustering of $\Lambda$ primary centroids to produce $\Lambda$ secondary clusters and corresponding $\Lambda$ secondary centroids ($\lambda\ll\Lambda\ll Y$)
630: Set of $\lambda$ secondary centroids
632: A step of providing the set of $\lambda$ secondary centroids to proximity-clustering process 614 to determine the set of refined object clusters
640: Secondary centroids and corresponding refined clusters of objects determined in process 614
700: An implementation of a process of generating primary clusters of objects based on the seeded-clustering approach
710: A process of acquiring descriptors of Y objects
720: A process of generating X sets of seed centroids of objects (initial values of centroids) where each set contains K seed centroids
730: A process of parallel execution of X seeded-clustering procedures, each seeded-clustering procedure accessing memory devices 342 to acquire tracked-objects descriptors; notably 730(0) corresponds to a first set of K seed centroids and 730(X−1) corresponds to the last set of K seed centroids (this requires a scheduling process to ensure conflict-free access to memory devices 342)
740: Process of determining K steady-state primary centroids of objects (embedded in process 730)
750: Process of combining the X×K primary centroids to be stored in memory device 344 for use in determining secondary clusters of primary centroids
800: Method of determining refined object clusters
810: Process of clustering X×K primary centroids according to a parameterized clustering method (DBSCAN) to produce $\lambda$ secondary clusters of primary centroids
820: Process of associating each object of the Y objects of the population under consideration with one of the $\lambda$ secondary centroids based on proximity to produce refined clusters of objects
830: Processing of forming the refined clusters of objects
920: Primary clusters generated according to a seeded-clustering method using a first set of K seed centroids (K=7).
925: primary centroids of primary clusters 920
1020: Primary clusters generated according to a seeded-clustering method using a second set of K seed centroids (K=7).
1025: primary centroids of primary clusters 1020
1510: A cluster of primary centroids
1520: Secondary centroid of a cluster 1510 of primary centroids
1600: Partitioned objects based on proximity to secondary centroids 1520
1710: Array of ν-dimensional vectors each representing absolute values of ν descriptors, ν≥1
1711: Identifiers of tracked objects
1712: Descriptor index
1714: Absolute vector of ν descriptors of an object
1716: Value of a descriptor
1720: Table indicating lower and upper bounds of normal values of the ν descriptors
1724: Lower bound of a normal descriptor
1726: Upper bound of a normal descriptor
1810: Array of normalized ν-dimensional vectors, ν≥1
1814: Normalized vector of ν descriptors of an object
1816: Normalized value of a descriptor
1820: Table indicating lower and upper bounds of normal values of absolute vector magnitudes and angular displacements
1822: Lower bound of magnitude
1824: Upper bound of magnitude
1826: Lower bound of angular displacement
1828: Upper bound of angular displacement
1920: Intervals of descriptor values
1921: Interval identifier, $\delta_\omega$, $0\le\omega<W$
1922: First interval $\delta_0$
1923: Last interval $\delta_{\omega-1}$
1924: Value of cumulative histogram for interval $\delta_\omega$, i.e., proportion of objects of descriptor values within intervals interval $\delta_0$ to $\delta_\omega$
1930: Cumulative normalized histogram of tracked values of a descriptor
1940: Descriptor values within lower and upper bounds
2000: Sets of centroid seeds
2010: ν-dimensional vector of descriptors of an object
2020: A set of ν-dimensional vectors of descriptors of K objects
2110: A process of acquiring a set of K initial centroids (seed centroids)
2120: A process of initializing K clusters, each cluster assigned one of the K initial centroids
2130: Step of initializing a sum of affinity measures
2140: Process of assigning each of N objects to centroids based on affinity measures
2141: Process of selecting an object
2242: Process of determining an affinity measure of a selected object to each centroid
2243: Process of identifying a preferred centroid for the selected object 2144: Process of adding an affinity measure to the sum of affinity measures
2145: A process of adding the selected object to the cluster corresponding to the preferred centroid
2150: Process of updating the centroids based on the content of corresponding clusters
2160: Process of determining a Global Centroid Shift, $\Delta_1$, based on comparing updated descriptors of all centroids with corresponding previous descriptors of the centroids
2180: Process of determining a Global Affinity enhancement, $\Delta_2$
2190: Process of deciding whether to revisit process 2130 followed by processes 2140 to 2180 based on the values of $\Delta_1$ and $\Delta_2$
2240: Alternate process of assigning each of N objects to centroids based on affinity measures
2245: Process of updating a centroid
2260: Process similar to process 2160 but based on output of process 2240
2270: Process similar to process 2170 but based on output of process 2240
2280: Process similar to process 2180 but based on output of process 2240
2290: Process similar to process 2190 but based on output of process 2240
2300: Process of generating primary centroids
2310: Process of initializing a set count and a superset of primary centroids
2320: Process of generating a new set of K centroid seeds
2325: Step of counting number of centroid-seed sets
2330: Process of accessing a memory device storing array 1710 of v-dimensional vectors
2340: Process of determining a set of K primary centroids
2350: Process of appending the set of K primary centroids to the superset of primary centroids
2360: Process of determining completion of primary-centroid generation
2400: Alternate process of generating primary centroids
2410: Process of generating M disjoint sets of K non-repeating randomly sequenced integers to index array 1710 of v-dimensional vectors
2420: Process of selecting a seed set subject to a determination that the number of considered centroid-seed sets is less than the specified number M
2430: Process of acquiring K descriptor vectors from array 1710 of v-dimensional vectors as initial centroid
2440: Module for determining K primary centroids starting with a set of K initial centroids
2450: Process of initializing each of K clusters to contain one of the K initial centroids
2460: Process of executing a K-means process to associate each of unassigned (N–K) objects with one of the K clusters
2470: Process of re-computing the K centroids based on content of each cluster
2480: Process of performing the K-means process again to associate each of the N objects with the newly computed centroids
2482: Process of determining whether a predefined convergence criterion has been met
2485: Process of repeating processes 2470 and 2480
2500: Parallel-processing arrangement for concurrent execution of clustering processes using multiple two-stage clustering modules
2510: Parameter-generation module
2520: Module for executing a K-means process for specified values of M and K
2530: Module for executing a DBSCAN process for specified values of density parameters
2540: Storage medium for holding data including computed centroids and content of each cluster
2550: Module for determining a Global Affinity Index for the set of clusters produced by each two-stage clustering module and selecting the set of clusters of highest Global Affinity Index
2610: Seeded Euclidean-K-means module
2620: Seeded angular-K-means module
2630: Seeded clustering modules
2632: Primary centroids
2640: Autonomous clustering module
2720: Seeded angular-K-means unit
2730: Normalized primary centroids
2740: Modified primary centroids unit
2810: Starting seed vectors of centroids
2820: Forced-clustering module
2840: Autonomous clustering module
3010: Memory device storing non-repeating randomly sequenced integers
3020: Memory device storing tracked objects data
3030: A processor/an assembly of processing units
3040: Memory device holding primary centroids
3050: Memory device storing processor-executable instructions for implementing Euclidean-K-means clustering process
3060: Memory device storing processor-executable instructions for implementing angular-K-means clustering process
3070: Memory device storing processor-executable instructions for implementing an autonomous clustering process

DETAILED DESCRIPTION

The invention provides methods and apparatus for segmentation of a social graph representing a large number of users of social networks. The term "social graph" is used herein to mean a representation of a social network. A social graph is represented by tracked data relevant to users of the Internet. Noting that the future "Internet of things" is not limited to human users, a tracked user is herein termed "an object" and is represented by a multidimensional vector quantifying attributes of the object.

Figure 3:
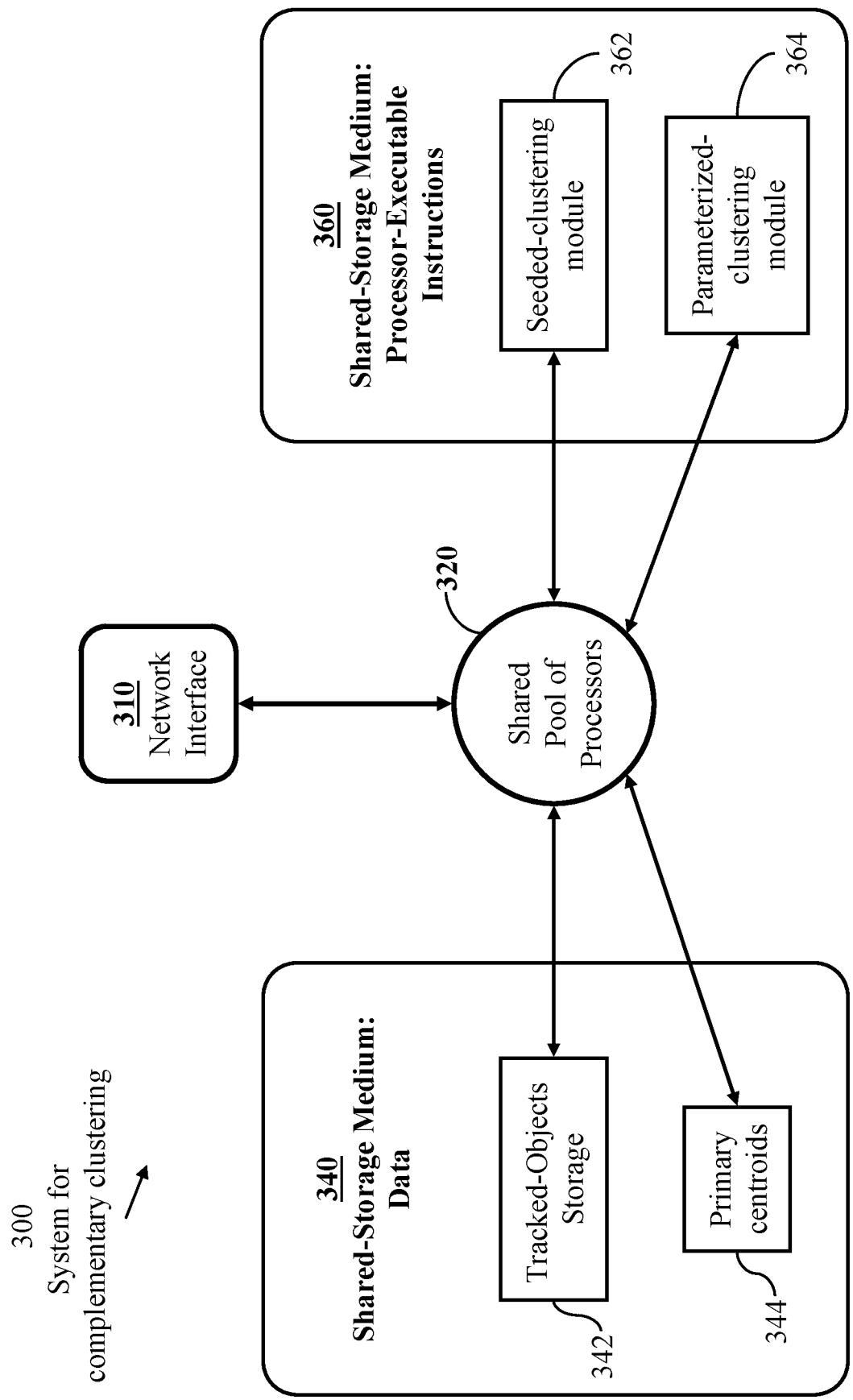
FIG. 3 illustrates a system for implementing complementary clustering, in accordance with an embodiment of the present invention.

FIG. 1 visualizes a social graph of a population 100 of tracked objects 102, where each object is characterized according to a number of attributes. Vectors of object descriptors may be held in a storage medium as illustrated in FIG. 3.

Figure 2:
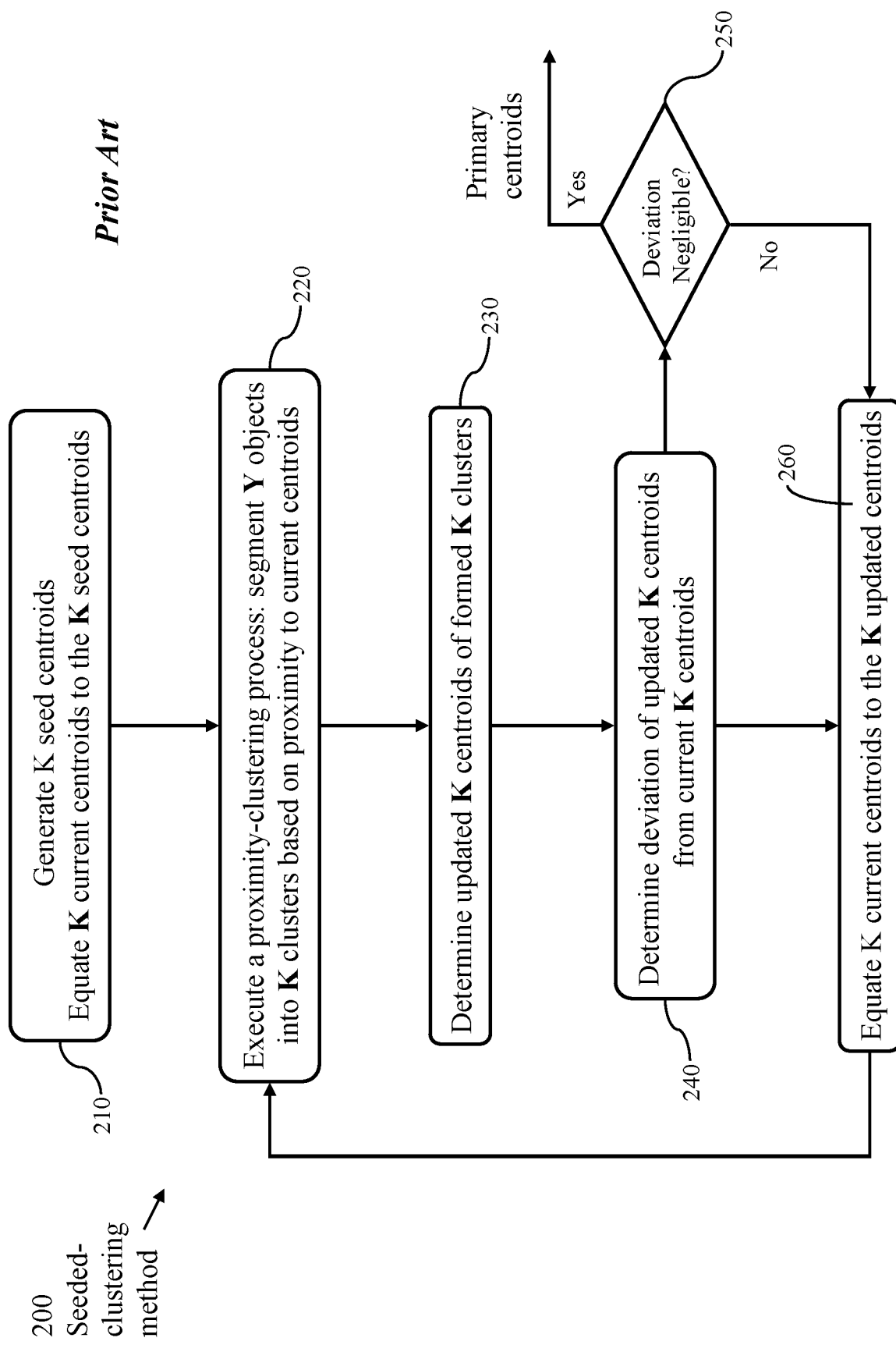
FIG. 2 illustrates a known method of object clustering.

FIG. 2 illustrates a known method 200 of object clustering of a population of Y objects, Y$\gg$1 (for example $10^8$). In process 210, a number K of seed centroids is generated according to some criterion, such as maximum mutual dispersion; 1<K<<Y. The K initial (seed) centroids are then successively updated as indicated in the loop 220-230-240-260-220. A proximity-based clustering process 220 is performed where each object is associated with the nearest centroid. When each of the Y objects is associated with a centroid, the initial centroids are updated (process 230). In a first approach, a centroid is recomputed after all of the Y objects are assigned. In a second approach, a centroid is recomputed whenever an object is associated with the centroid. Thus, according to the first approach, after the first round of assignment of objects to the current (initial) centroids, a specific centroid which attracts v objects, v>0, is updated (recomputed) once after associating the $v^{th}$ object based on (v+1) descriptor vectors. According to the second approach, the specific centroid would be updated ν times, each update being based on two descriptor vectors.

To determine if another round of assignment of the Y objects to the updated K centroids, process 240 determines deviation of the updated K centroids from the previous K centroids. If the magnitude of the deviation is determined (process 250) to be below a predefined threshold, the seeded clustering process is considered complete. Otherwise, the updated centroids are used as the current centroids (process 240) and process 220 is revisited.

Alternatively, a count of the number of object-to-centroid updates is determined, and when the number is zero, or below a predefined threshold, the seeded clustering process is considered complete. After the first round of associating each of the Y objects with one of the K centroids, the count would be Y, since none of the Y objects is initially associated with any centroid. After a second round of associating each of the Y objects with one of the updated K centroids, the count would be significantly reduced.

FIG. 3 illustrates a system for implementing a complementary clustering process of a plurality of objects according to the present invention. The system comprises a network interface 310 for exchanging data with a user of the system, a pool of processors 320, and storage media 340 and 360. Storage medium 340 comprises a memory device 342 storing descriptor vectors of tracked objects and a memory device 344 holding intermediate processed data such as computed primary centroids of the plurality of objects determined according to the seeded-clustering method of FIG. 2. Storage medium 360 comprises a memory device 362 holding software instructions relevant to at least one seeded clustering method for determining the primary centroids and a memory device 364 holding software instructions relevant to at least one parameterized clustering method for determining secondary clusters and secondary centroids of the primary centroids.

Storage medium 360 further stores a module (not illustrated) comprising software instructions for determining refined clusters of the plurality of objects based on the secondary centroids. Storage medium 340 further comprises a memory device (not illustrated) for storing the secondary centroids and the refined clusters.

Figure 4:
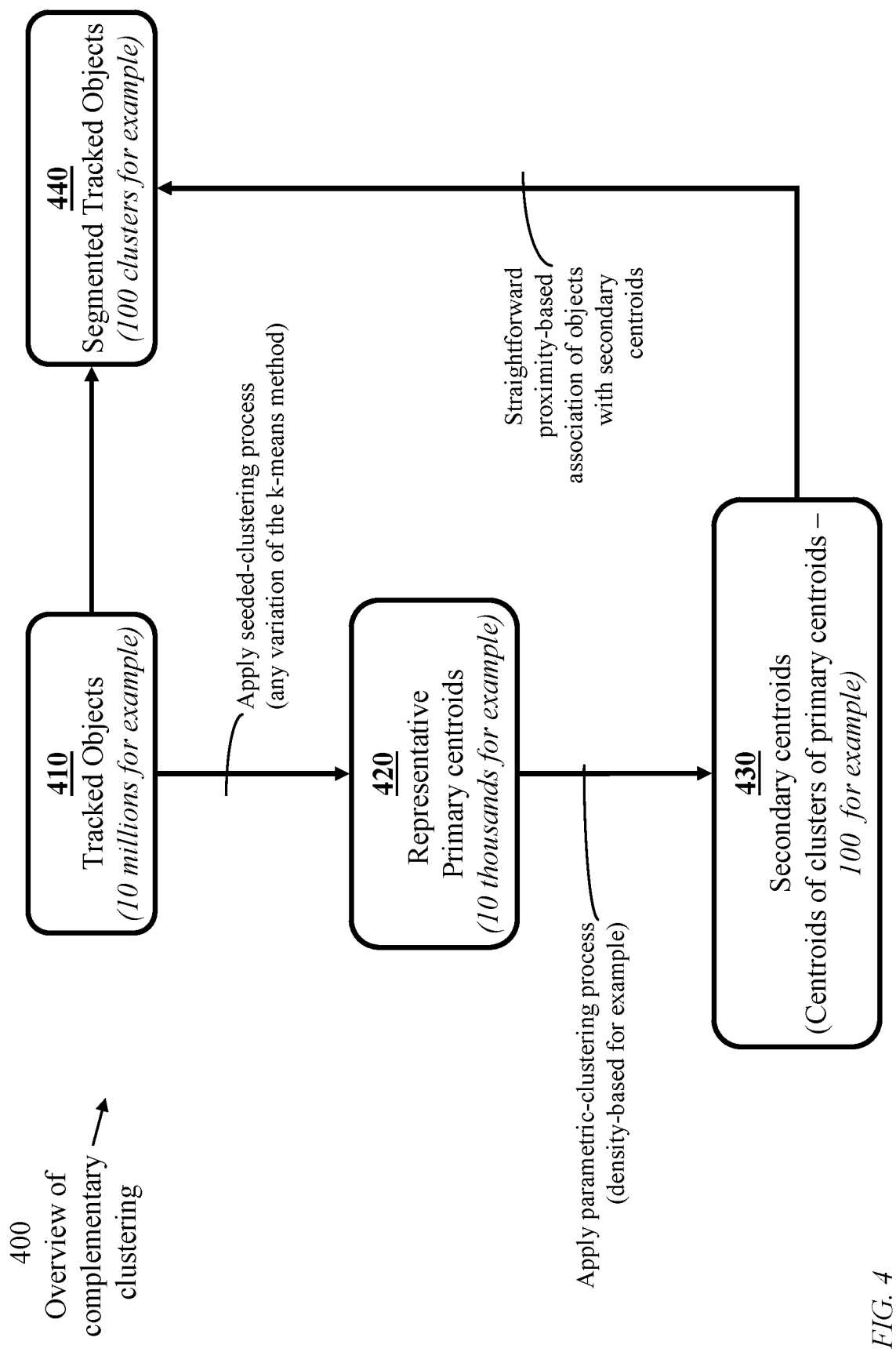
FIG. 4 is an overview of a complementary-clustering method, in accordance with an embodiment of the present invention.

FIG. 4 provides an overview 400 of the complementary clustering method of the present invention. Starting with stored descriptors 410 of tracked objects (memory device 342), a seeded-clustering method is applied to determine a set of primary centroids 420, based—for example—on the method of FIG. 2. A parametric-clustering method is applied to the primary centroids 420 to determine a set of secondary centroids 430. A process 440 associates each object with a respective secondary centroid. Thus, clusters of objects associated with respective secondary centroids are identified.

Figure 5:
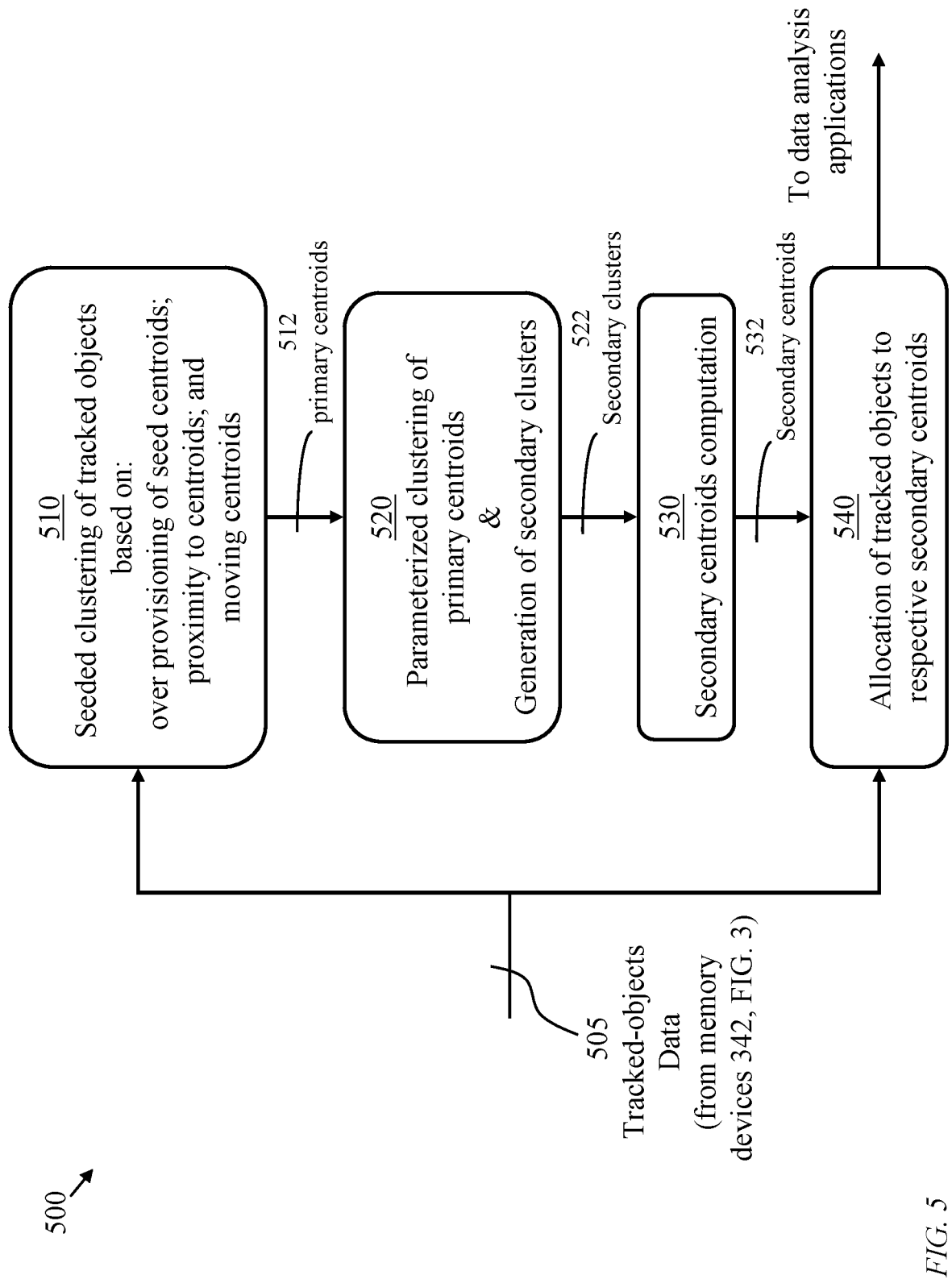
FIG. 5 illustrates basic processes of the complementary-clustering method, in accordance with an embodiment of the present invention.

FIG. 5 illustrates basic processes 500 of the complementary-clustering method of FIG. 4. A seeded-clustering process 510 of Y tracked-objects, based on tracked-objects data 505 acquired from memory device 342, is applied X times, X>1, using different initial seed centroids. Process 510 produces a set 512 of Λ=X×K primary centroids (centroids of initial clusters of objects). Preferably, an inflated number K of initial centroids is used. Generally the values of X and K may be selected so that Λ at least equals a predefined lower limit; X>1, K>1.

A process 520 of parameterized clustering of the set 512 of primary centroids is applied to the Λ primary centroids to produce a set 522 of λ secondary clusters (clusters of the primary centroids). Process 530 computes a set 532 of λ secondary centroids of the λ secondary clusters 522. Process 540 defines a number λ of refined clusters of the Y objects based on the set of λ secondary centroids 532 and the tracked-objects data 505.

Figure 6:
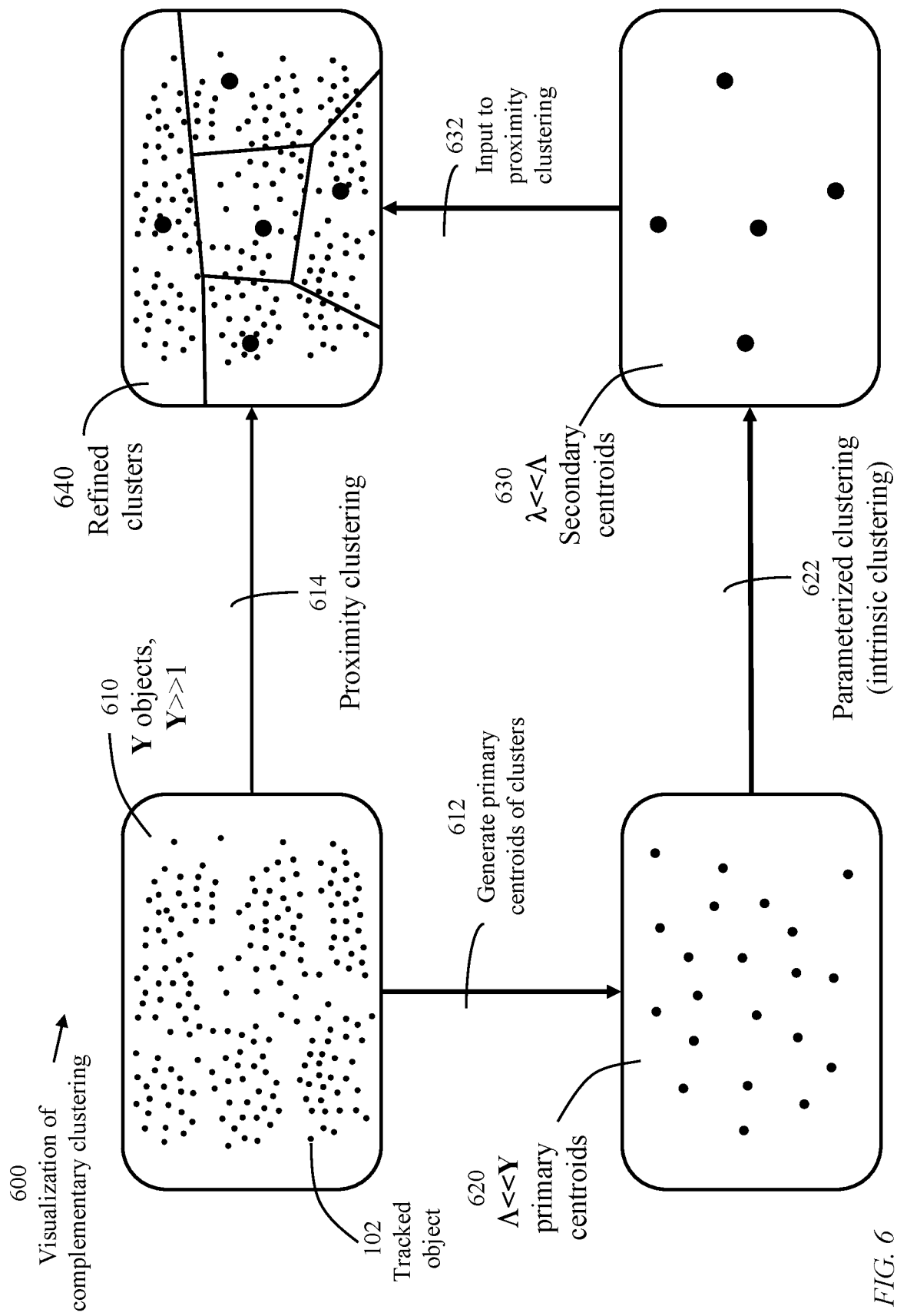
FIG. 6 provides visualization of the complementary-clustering method, in accordance with an embodiment of the present invention.

FIG. 6 provides visualization 600 of the complementary-clustering processes. A process 612 generates a set 620 of Λ primary clusters of objects and corresponding Λ primary centroids of Y objects under consideration based on X sets of K clusters of objects 102 (Λ=X×K, Λ<<Y). A process 622 of parameterized clustering of the Λ primary centroids produces a set 630 of λ secondary clusters and corresponding secondary centroids. A process 614 of proximity-based clustering is applied to the plurality 610 of objects 102 to determine a set 640 of refined clusters corresponding to the set 630 of λ secondary centroids.

Figure 7:
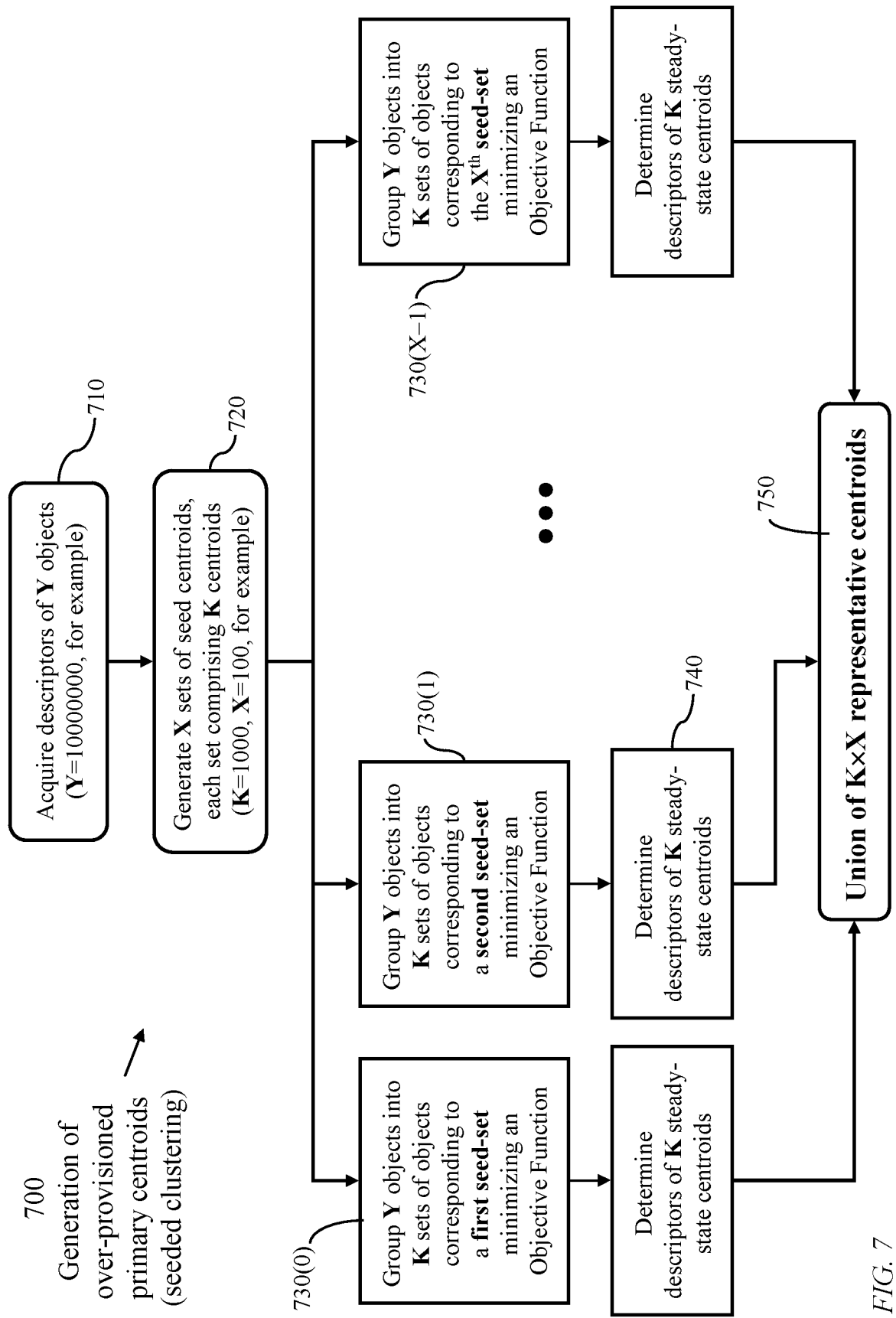
FIG. 7 illustrates processes of generating primary clusters of objects and corresponding primary centroids, in accordance with an embodiment of the present invention.

FIG. 7 illustrates an implementation of a process 700 of generating primary clusters of objects based on the seeded-clustering approach. A process 710 acquires descriptor vectors of Y objects. A process 720 generates X different sets of seeds of centroids of objects (initial values of centroids) where each set contains K seed centroids. Multiple processors of the shared pool of processors 320 may be employed for parallel execution of X seed-clustering processes 730, X>1. Each seed clustering process accesses memory device 342 to acquire tracked-objects descriptors. Process 730(0) corresponds to a first set of K seed centroids, process 730(1) corresponds to a second set of K seed centroids, and process 730(X−1) corresponds to the last set of K seed centroids. An appropriate scheduling process ensures conflict-free access to memory devices 342. Process 740 determines K steady-state primary centroids of objects. Process 750 combines the X×K primary centroids to be stored in memory device 344.

Figure 8:
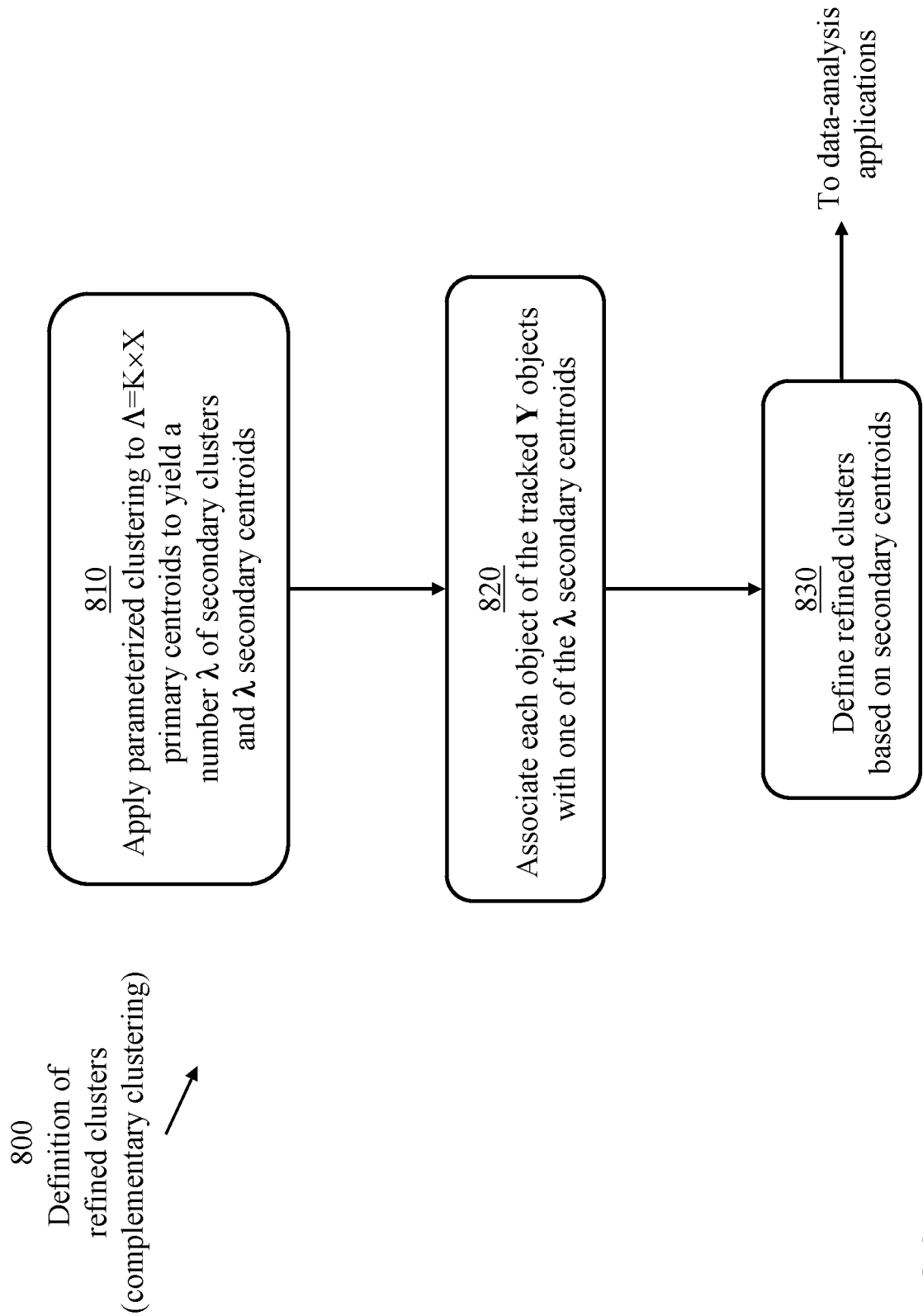
FIG. 8 illustrates processes of clustering primary centroids and determining secondary centroids, in accordance with an embodiment of the present invention.

FIG. 8 illustrates a method 800 of determining refined clusters of the X×K primary clusters. Process 810 segments X×K primary centroids according to a parameterized clustering method, such as the DBSCAN (density-based spatial clustering of applications with noise) method. Process 820 associates each object of the Y objects of the population under consideration with one of the secondary centroids based on proximity to produce refined clusters of objects. Process 830 forms refined clusters of objects.

Figure 9:
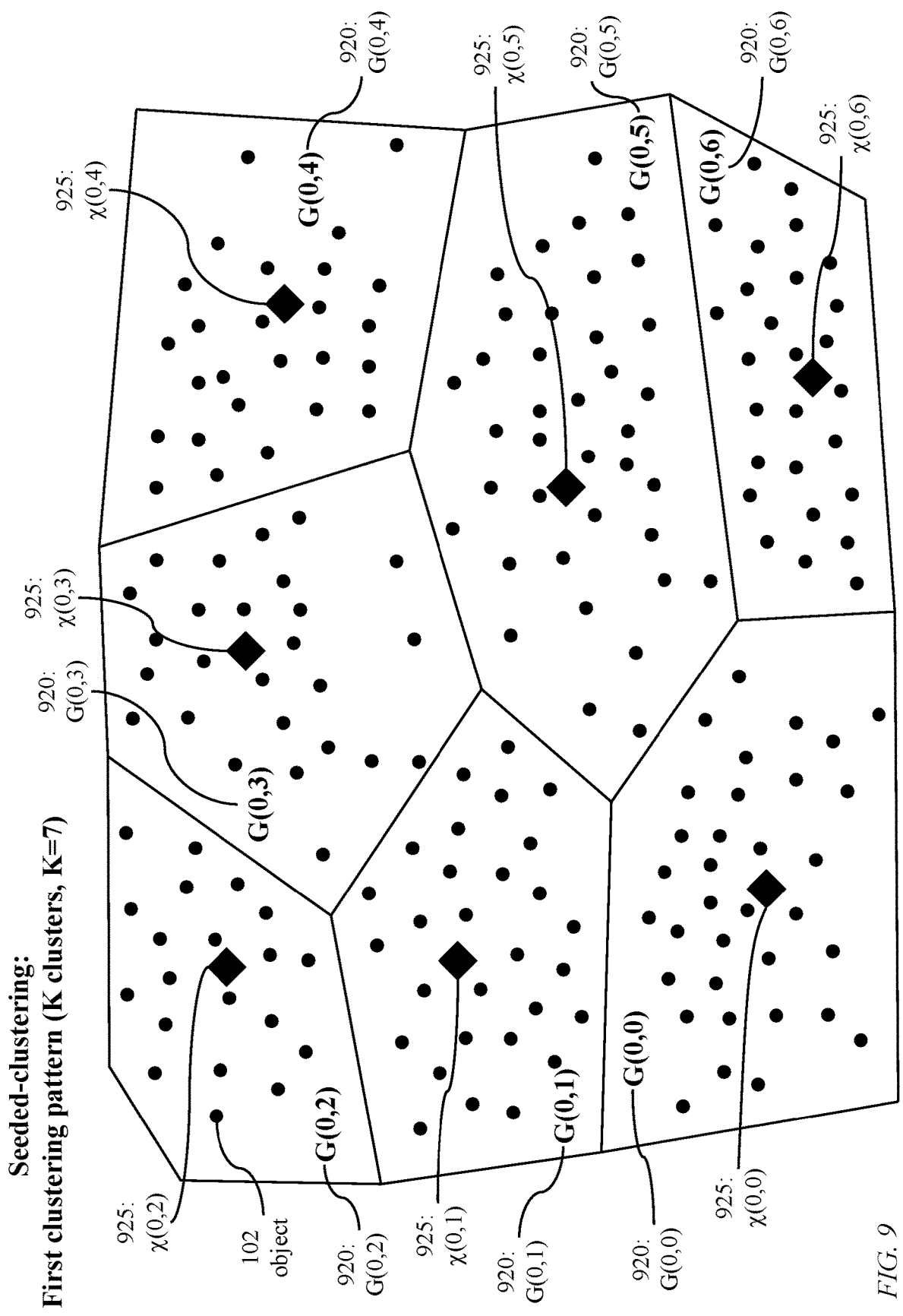
FIG. 9 illustrates primary clusters generated according to a seeded-clustering method using a first set of K initial centroids (K=7), in accordance with an embodiment of the present invention.

FIG. 9 illustrates primary clusters 920 generated according to a seeded-clustering method using a first set of K initial centroids (K=7). Seven primary clusters 920, denoted {G(0, 0), G(0,1_, . . . , G(0,6)}, each including a respective number of objects 102, are formed. The centroid 925 of a primary cluster G(0,j) is denoted $\chi(0,j)$, $0 \leq j < K$.

Figure 10:
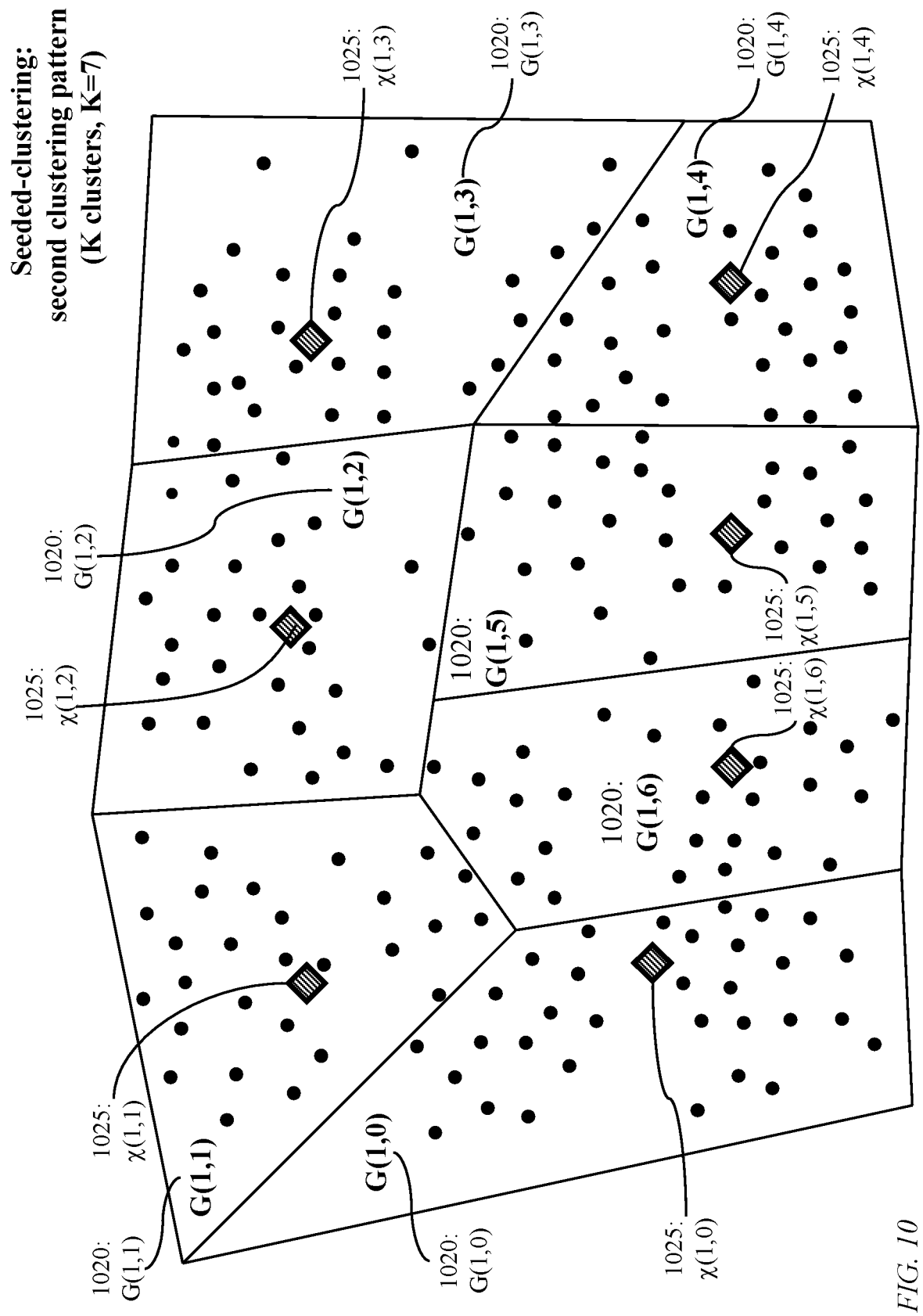
FIG. 10 illustrates primary clusters generated according to a seeded-clustering method using a second set of K initial centroids (K=7), in accordance with an embodiment of the present invention.

FIG. 10 illustrates primary clusters 920 generated according to a seeded-clustering method using a second set of K initial centroids (K=7). Seven primary clusters 920, denoted {G(1,0), G(1,1_, . . . , G(1,6)}, each including a respective number of objects 102, are formed. The primary centroid 1025 of a primary cluster G(1,j), is denoted $\chi(1,j)$, $0 \leq j < K$.

Figure 11:
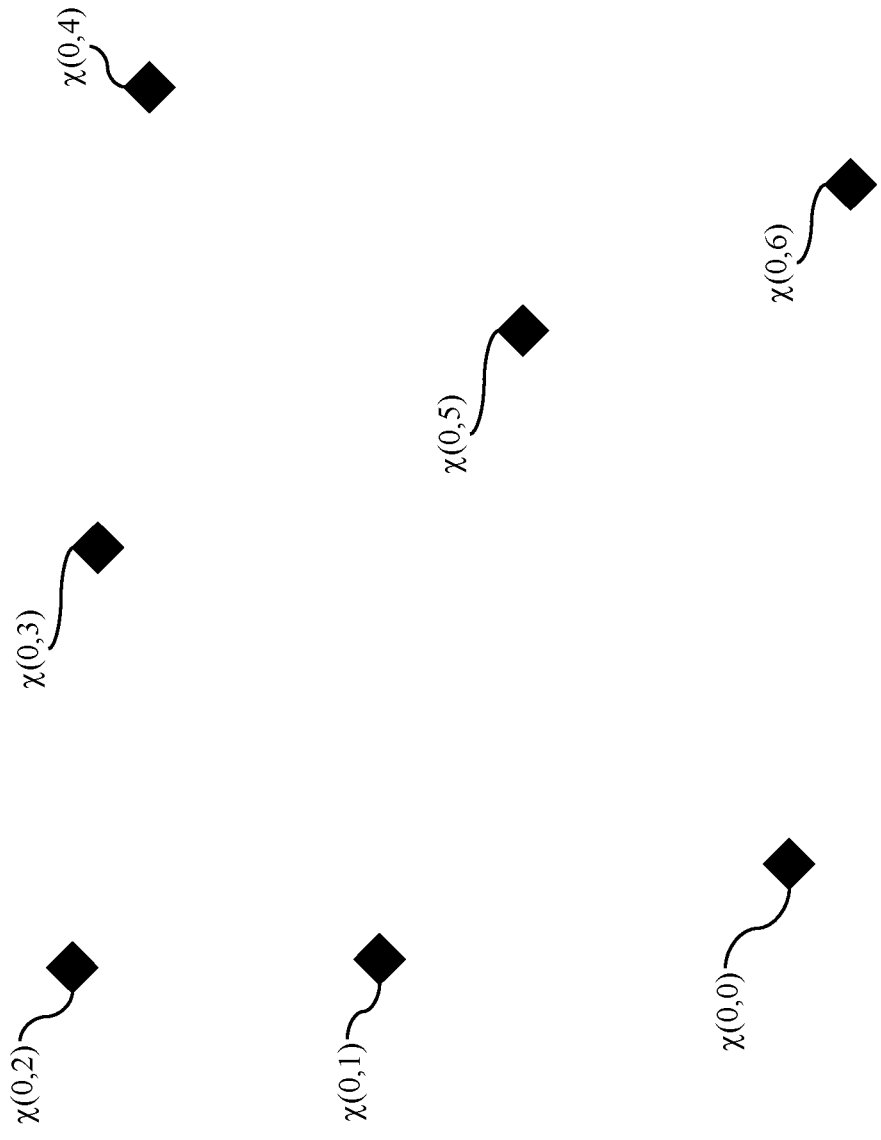
FIG. 11 illustrates primary centroids corresponding to the primary clusters of FIG. 9.

FIG. 11 illustrates the primary centroids {$\chi(0,0)$, $\chi(01)$, . . . , $\chi(0,6)$} corresponding to the primary clusters of FIG. 9.

Figure 12:
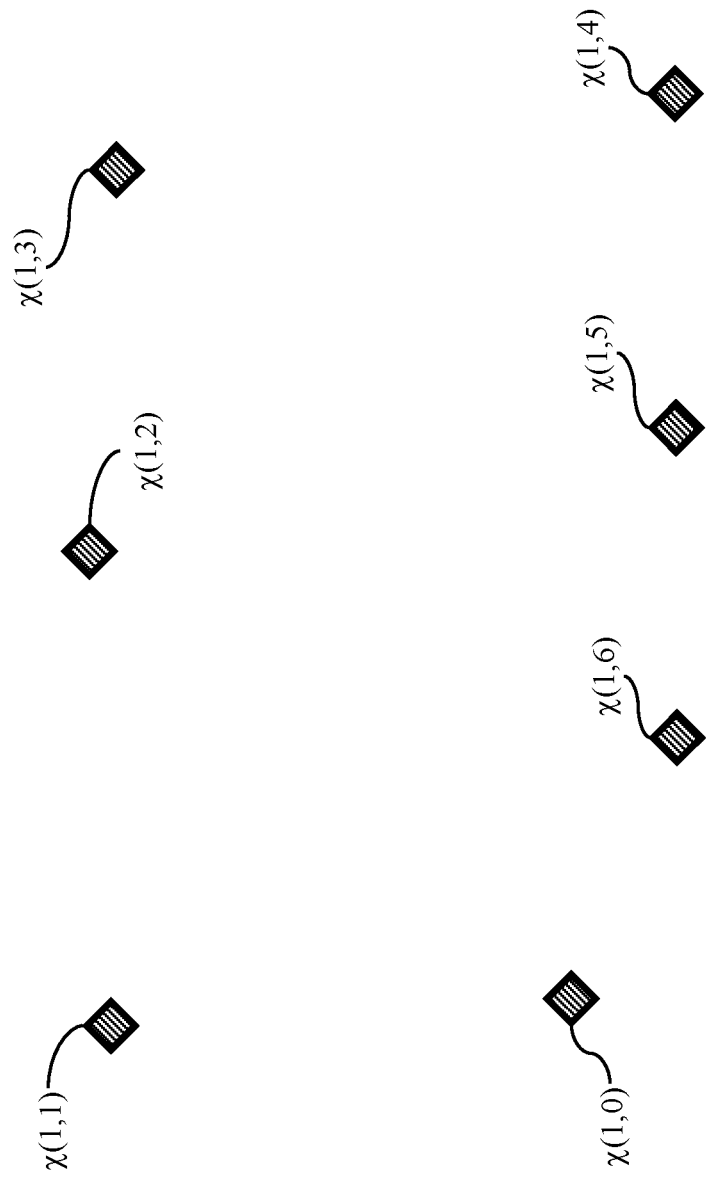
FIG. 12 illustrates primary centroids corresponding to the primary clusters of FIG. 10.

FIG. 12 illustrates primary centroids {$\chi(1,0)$, $\chi(11)$, . . . , $\chi(1,6)$} corresponding to the primary clusters of FIG. 10.

Figure 13:
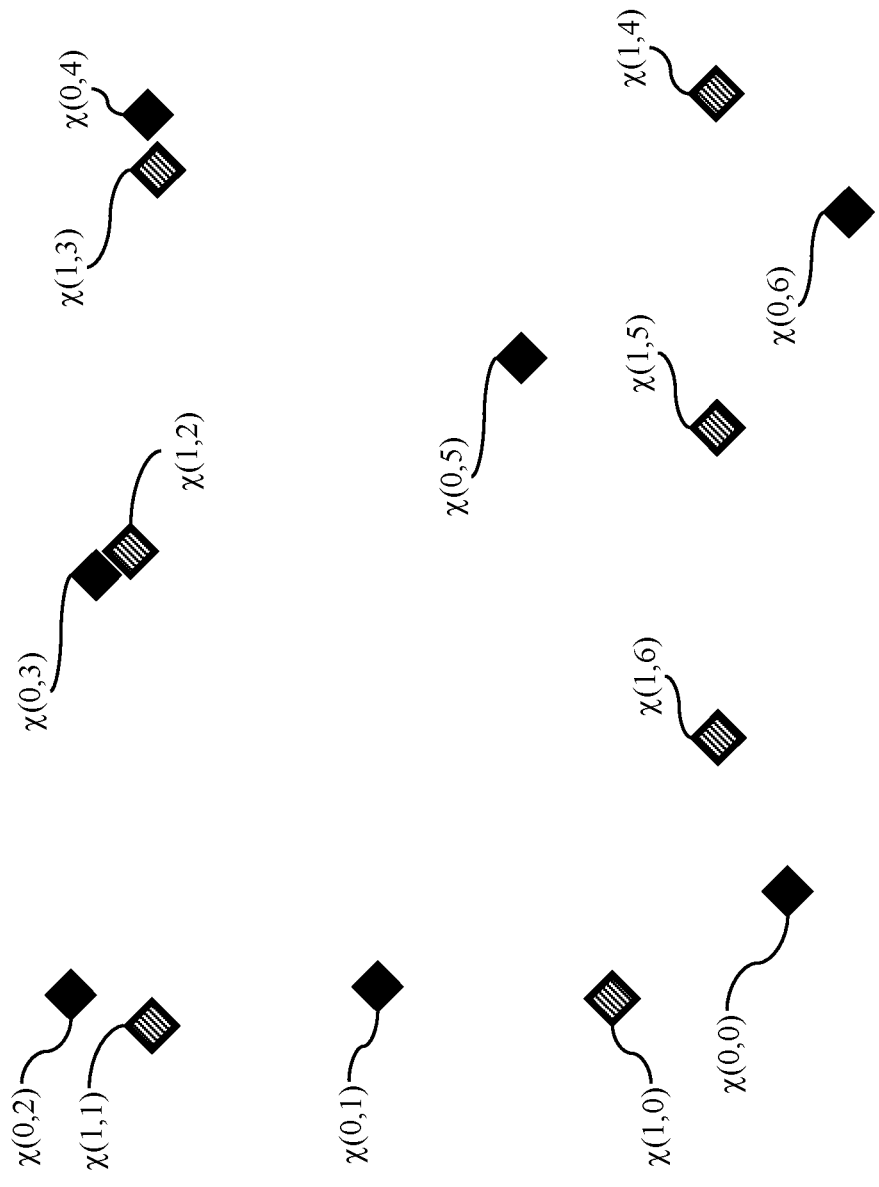
FIG. 13 illustrates the union of the primary centroids of FIG. 11 and FIG. 12.

FIG. 13 illustrates the union of the primary centroids of FIG. 11 and FIG. 12.

FIG. 14 illustrates a union of the primary centroids of FIG. 11 and FIG. 12, as well as primary centroids determined using a third set of K seed centroids and a fourth sets of K seed centroids. The total number of primary centroids is X×K; X=4 and K=7.

Figure 15:
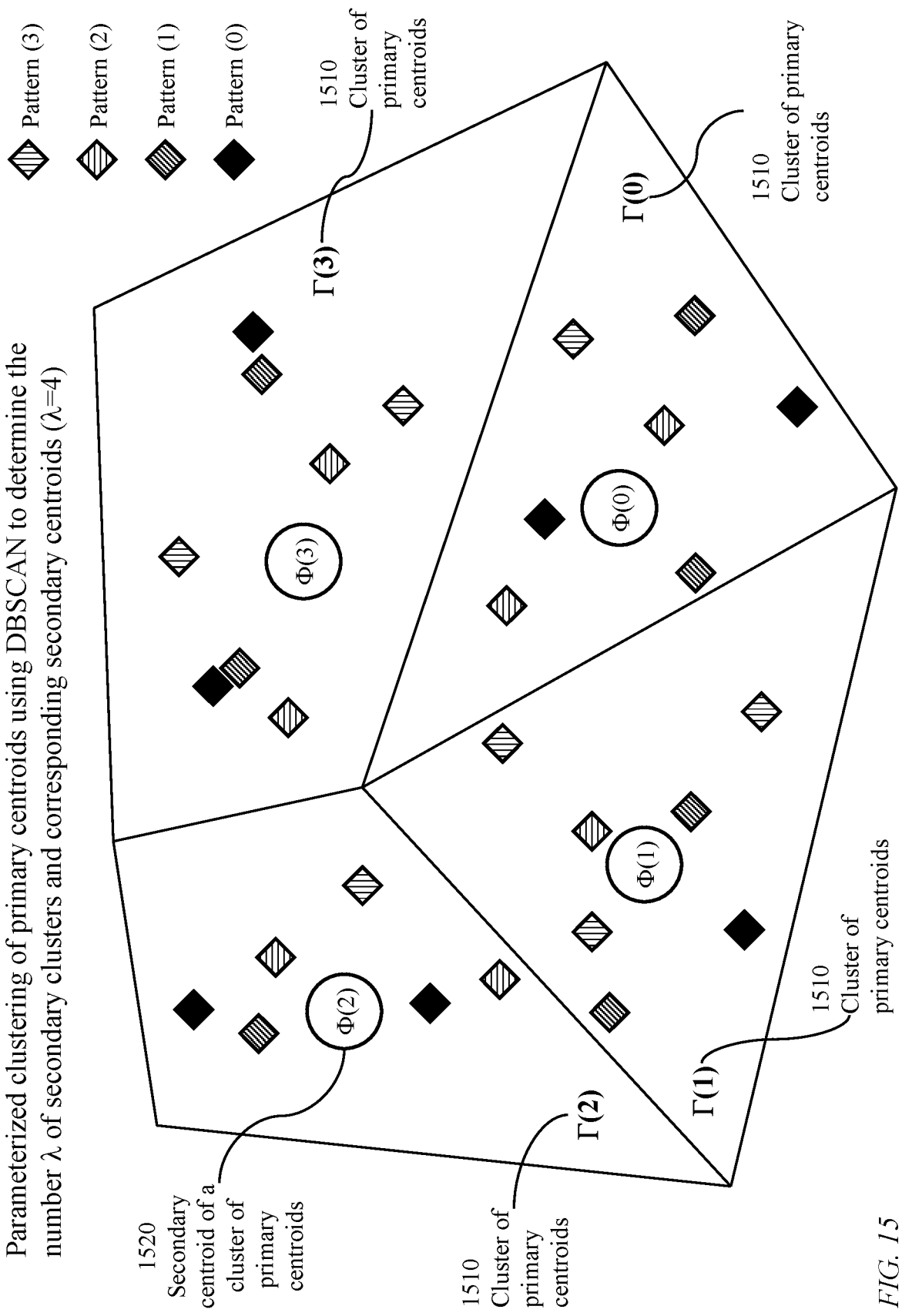
FIG. 15 illustrates parameterized clustering of the union of primary centroids of FIG. 14, in accordance with an embodiment of the present invention.

FIG. 15 illustrates λ secondary clusters 1510 of primary centroids, resulting from a parameterized clustering procedure applied to X×K primary centroids (X=4, K=7, λ=4).

The secondary clusters 1510 are denoted Γ(π), and the corresponding secondary centroids 1520 are denoted Φ(π), $0 \le \pi < \lambda$. Notably, the number λ of secondary clusters is influenced by the selected values of X and K but does not necessarily bear any specific relationship to X or K.

Figure 16:
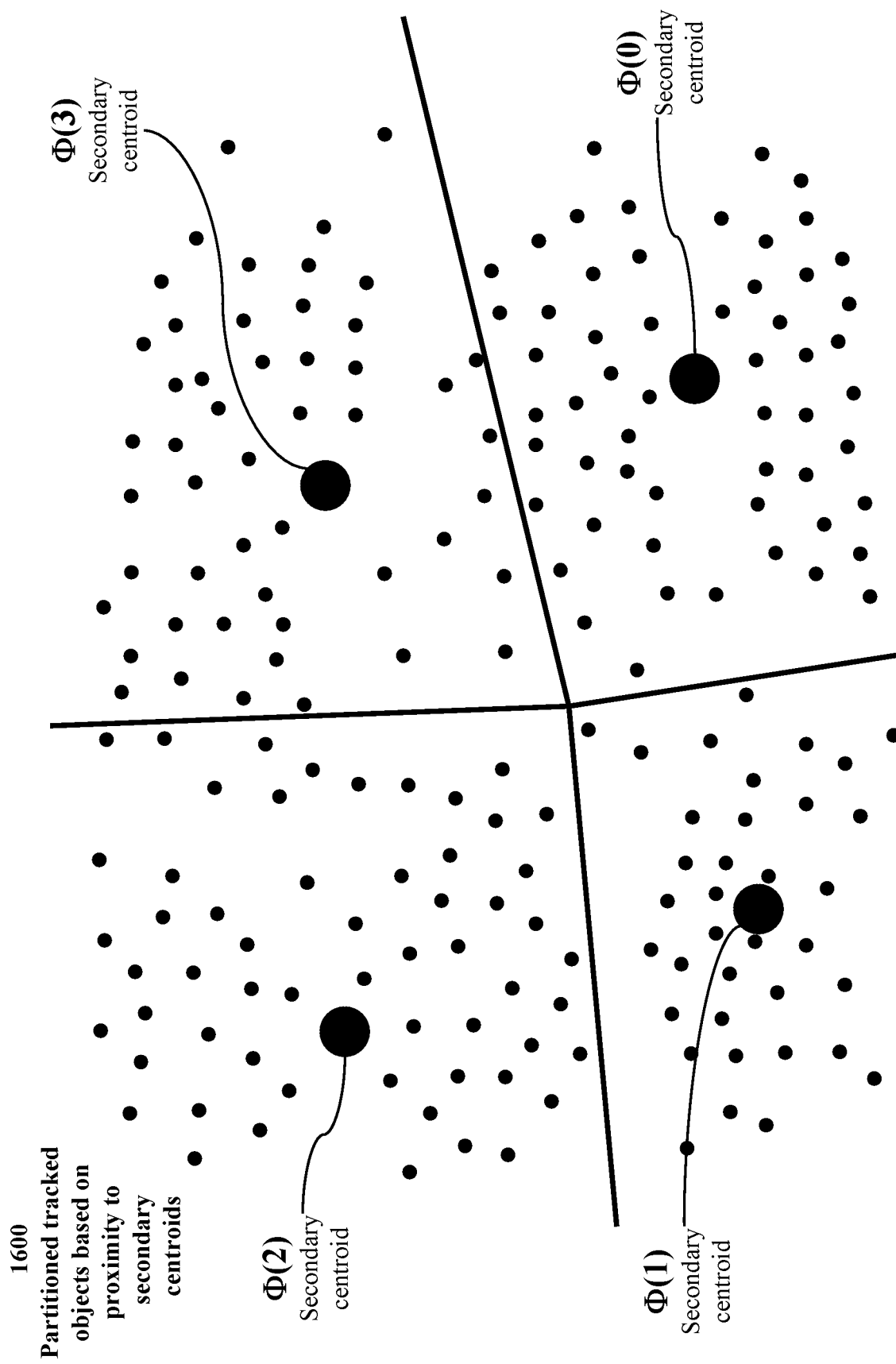
FIG. 16 illustrates partitioned objects based on straight-forward proximity of objects to the secondary centroids, in accordance with an embodiment of the present invention.

FIG. 16 illustrates partitioned objects 102 based on proximity of the objects 102 to the secondary centroids 1520.

A major advantage of the complementary clustering method of the present invention is that the method yields a favourable number of centroids (the secondary centroids) starting with an arbitrary number of judicially selected seed centroids. The parameterized clustering procedure (the DBSCAN procedure, for example) processes primary centroids, of a plurality of objects, determined according to a seeded clustering method to generate secondary clusters and corresponding secondary centroids of the primary centroids. Refined clusters of the plurality of objects based on the secondary centroids are considered to more accurately reflect the essential nature of the plurality of objects.

Figure 17:
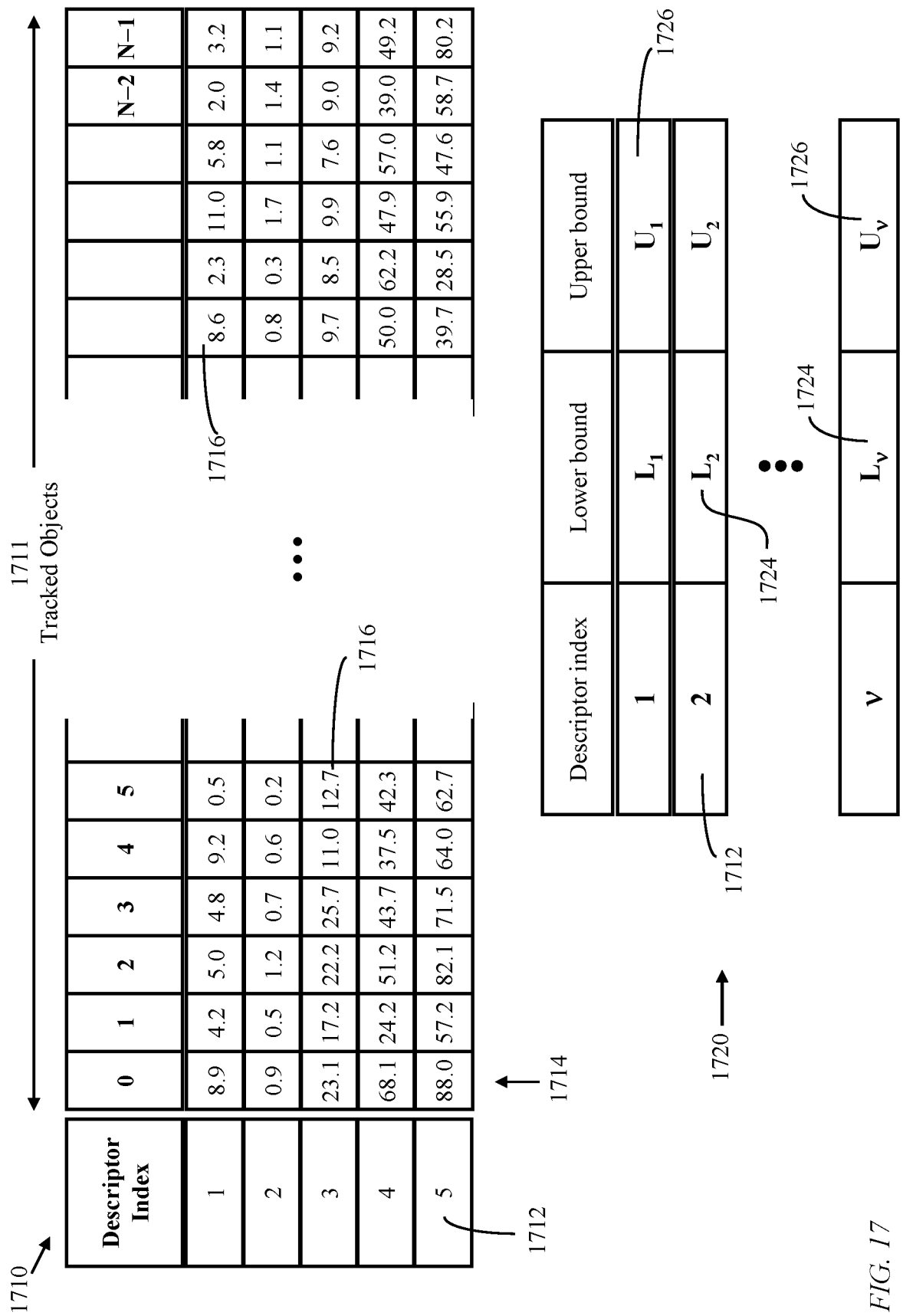
FIG. 17 illustrates an array of multi-dimensional absolute vectors each absolute vector representing a number of absolute values of descriptors of tracked objects, the figure also illustrates a lower and upper bound of descriptors considered to be "normal" descriptors.

FIG. 17 illustrates an array 1710 of v-dimensional vectors 1714 each vector representing absolute values 1716 of v descriptors of N tracked objects 1711, $v \ge 1$, $N \gg 1$. The tracked objects are identified as numerals 0 to (N−1). In the illustrated exemplary case v=5 and the descriptors are identified by indices 1712. Table 1720 indicates a lower bound 1724 and an upper bound 1726 of values of descriptors considered to be "normal values".

Figure 18:
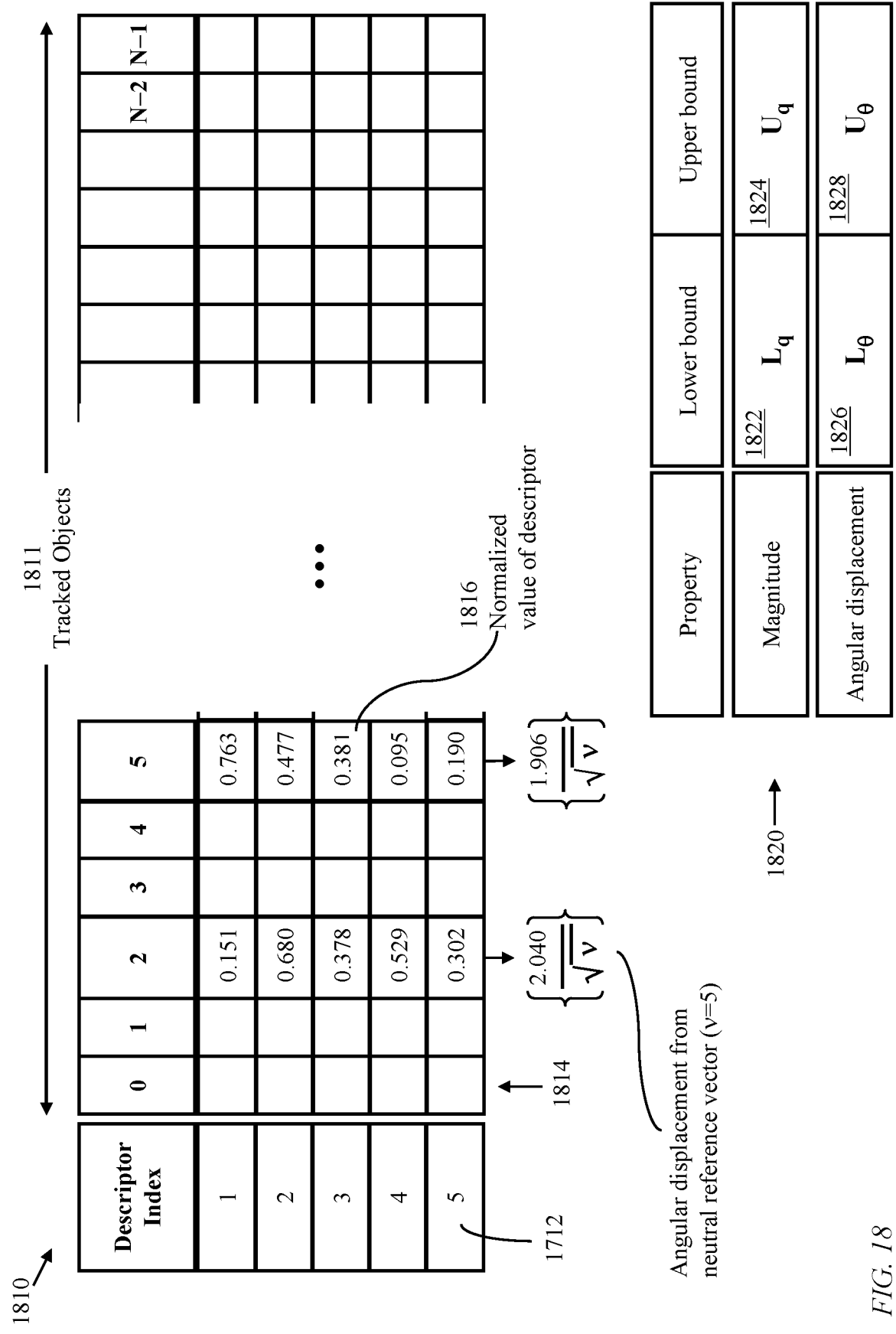
FIG. 18 illustrates an array of multi-dimensional normalized vectors each normalized vector representing a number of normalized values of descriptors of tracked objects, the figure also illustrates lower and upper bounds of magnitudes of the absolute vectors considered to be "normal" magnitudes as well as lower and upper bounds of angular displacements considered to be normal angular displacements, an angular displacement being determined with respect to a neutral unit vector.

FIG. 18 illustrates an array 1810 of normalized v-dimensional vectors 1814 each normalized vector representing a number of descriptors of tracked objects. A vector 1714 is normalized by dividing the value of each of the respective v descriptors by the magnitude of the vector to produce a respective normalized value 1816. The dot product of any two normalized vectors represents the value of the projection of one of the two normalized vector onto the other. Thus, the dot product may be used as a measure of "angular" affinity of the two normalized vectors. One of the two vectors may be a candidate centroid in a clustering process.

Table 1820 illustrates lower and upper bounds of magnitudes of the absolute vectors considered to be normal magnitudes as well as lower and upper bounds of angular displacements considered to be normal angular displacements. An angular displacement being determined with respect to a neutral reference vector of v dimensions [η, η, . . . , η](transposed) where $\eta = v^{(-1/2)}$. Table 1820 indicates:
- a lower bound (denoted $L_q$) 1822 and upper bound (denoted $U_q$) 1824 of magnitudes of vectors 1714 considered to be within the range of normal values; and
- a lower bound (denoted $L_\theta$) 1826 and upper bound (denoted $U_\theta$) 1828 of angular displacements of vectors 1814 from the neutral reference vector considered to be within the range of normal angular displacements.

Descriptor values below a respective lower bound $L_j$ or higher than a respective upper bound $U_j$ (FIG. 17) may be considered outliers. A descriptor vector of a magnitude below a predefined lower bound $L_q$ or above a predefined upper bound $U_q$ may also be considered an outlier. While each object may be a member of a cluster, it is preferable that a vector 1714 of descriptors be considered as an initial-centroid candidate only if the vector contains less than a specified number of descriptors that are outliers and has a magnitude within the bounds $L_q$ and $U_q$.

Figure 19:
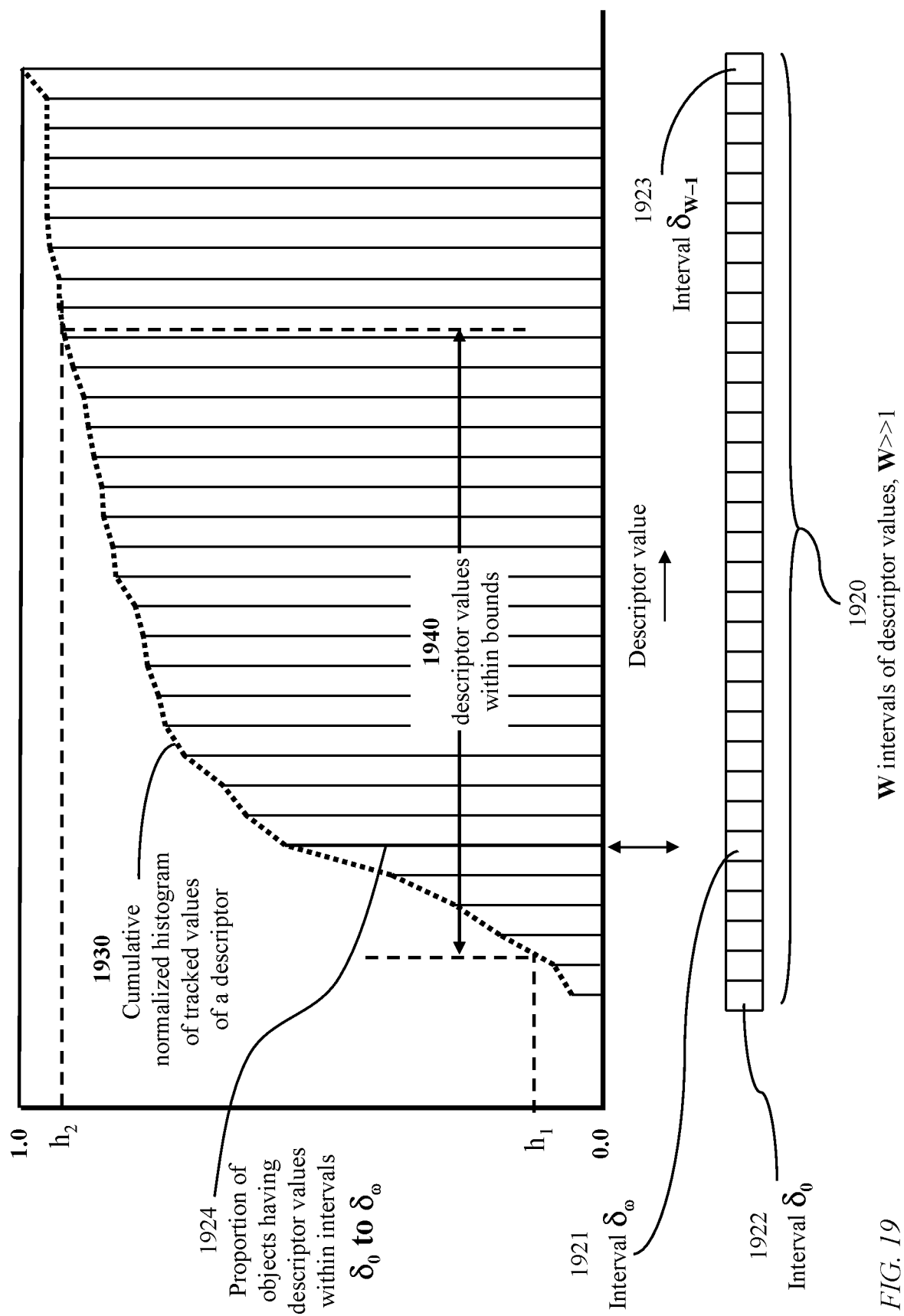
FIG. 19 illustrates a cumulative normalized histogram of individual descriptors of tracked objects used for determining lower and upper bounds of descriptors considered to be normal; a cumulative normalized histogram of magnitudes of the absolute vectors representing the tracked objects or a cumulative normalized histogram of the angular displacements of the vectors (absolute or normalized) may also be used to identify vectors considered to be of normal values.

FIG. 19 illustrates a cumulative normalized histogram 1930 of tracked values of an individual descriptor of the N tracked objects used for determining a lower bound $L_j$ and an upper bound $U_j$ of a descriptor of index j considered to be normal.

The minimum and maximum values of the descriptor under consideration are determined from the data of array 1710. A number W of intervals 1920 of descriptor values between the minimum and maximum values is selected to be sufficiently large to enable forming a histogram of fine granularity. The W intervals $\delta_\omega$, $0 \le \omega < W$ may be of equal widths. Alternatively, since fine granularity is needed only at the extremities of the histogram, middle intervals—cautiously selected—may be of significantly larger width. The value 1924 of the cumulative histogram for interval $\delta_\omega$ is the proportion of objects of descriptor values within intervals $\delta_0$ to $\delta_\omega$. The descriptor's values 1940 considered to be normal correspond to cumulative normalized histogram values between $h_1$ and $h_2$. The values of $h_1$ and $h_2$ are predefined; naturally, $h_1 \ll 1.0$ and $(1-h_2) \ll 1.0$.

Likewise, a cumulative distribution of magnitudes of the vectors 1714 of absolute descriptors representing the N tracked objects may be used to determine the lower bound $L_q$ and upper bound $U_q$. A cumulative distribution of the angular displacements of the vectors (absolute or normalized) from the neutral reference vector may also be used to determine the lower bound $L_\theta$ and upper bound $U_\theta$. The initial centroids used in a seeded clustering process are preferably selected to be of normal values between determined lower bounds and upper bounds.

Figure 20:
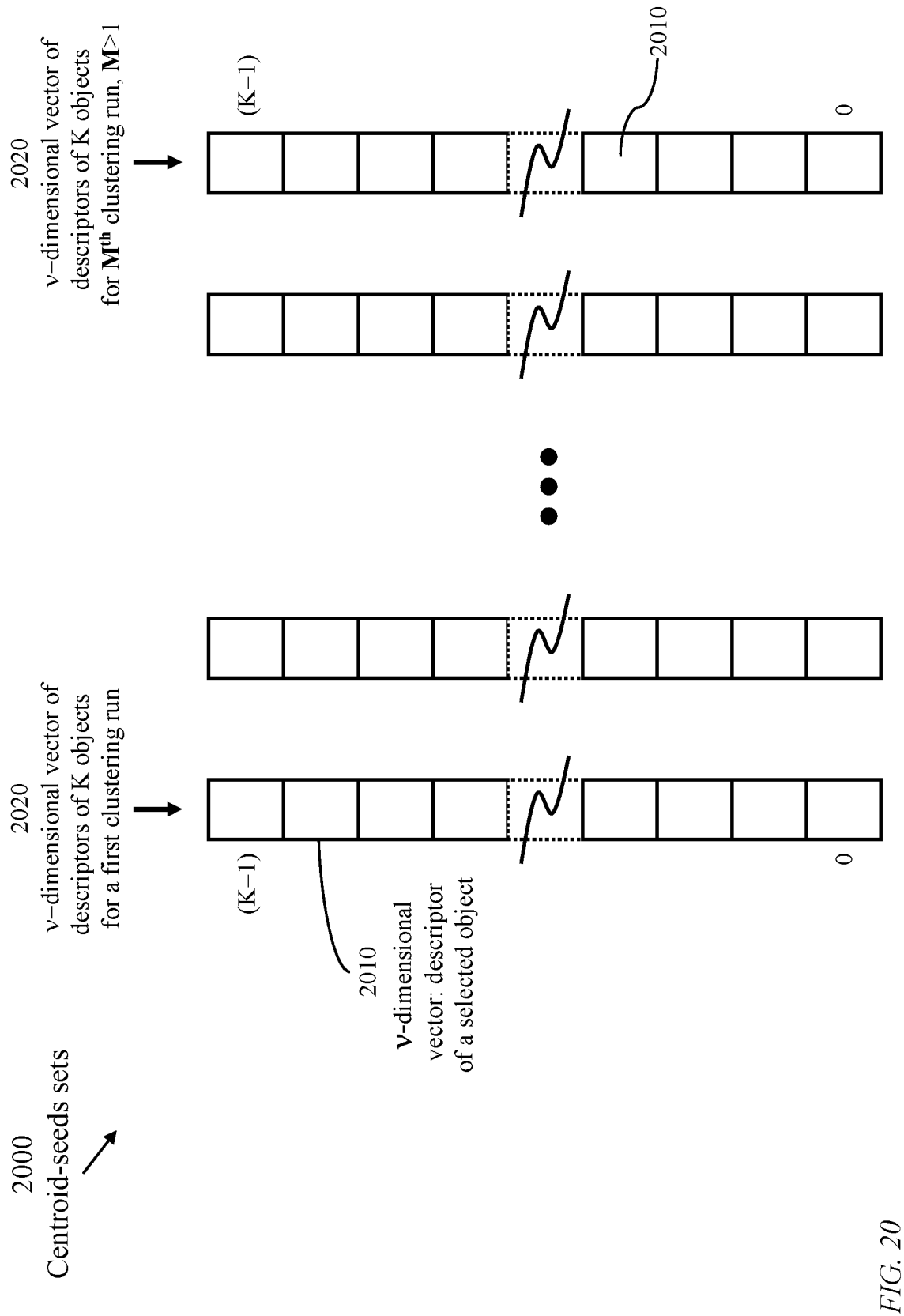
FIG. 20 illustrates a number, M, of sets of centroid seeds each comprising K centroid seeds, the integers M and K being a design parameters which may be determined by a (human) user or automatically based on the tracked objects.

FIG. 20 illustrates a superset 2000 of centroid seeds comprising a number, M, of sets 2020 of centroid seeds. Each set of centroid seeds comprises K centroid seeds each represented as a v-dimensional vector 2010 of descriptors. The integers M and K are design parameters which may be determined based on the tracked objects. Each centroid seed 2010 is a v-dimensional vector of descriptors of a selected object.

Figure 21:
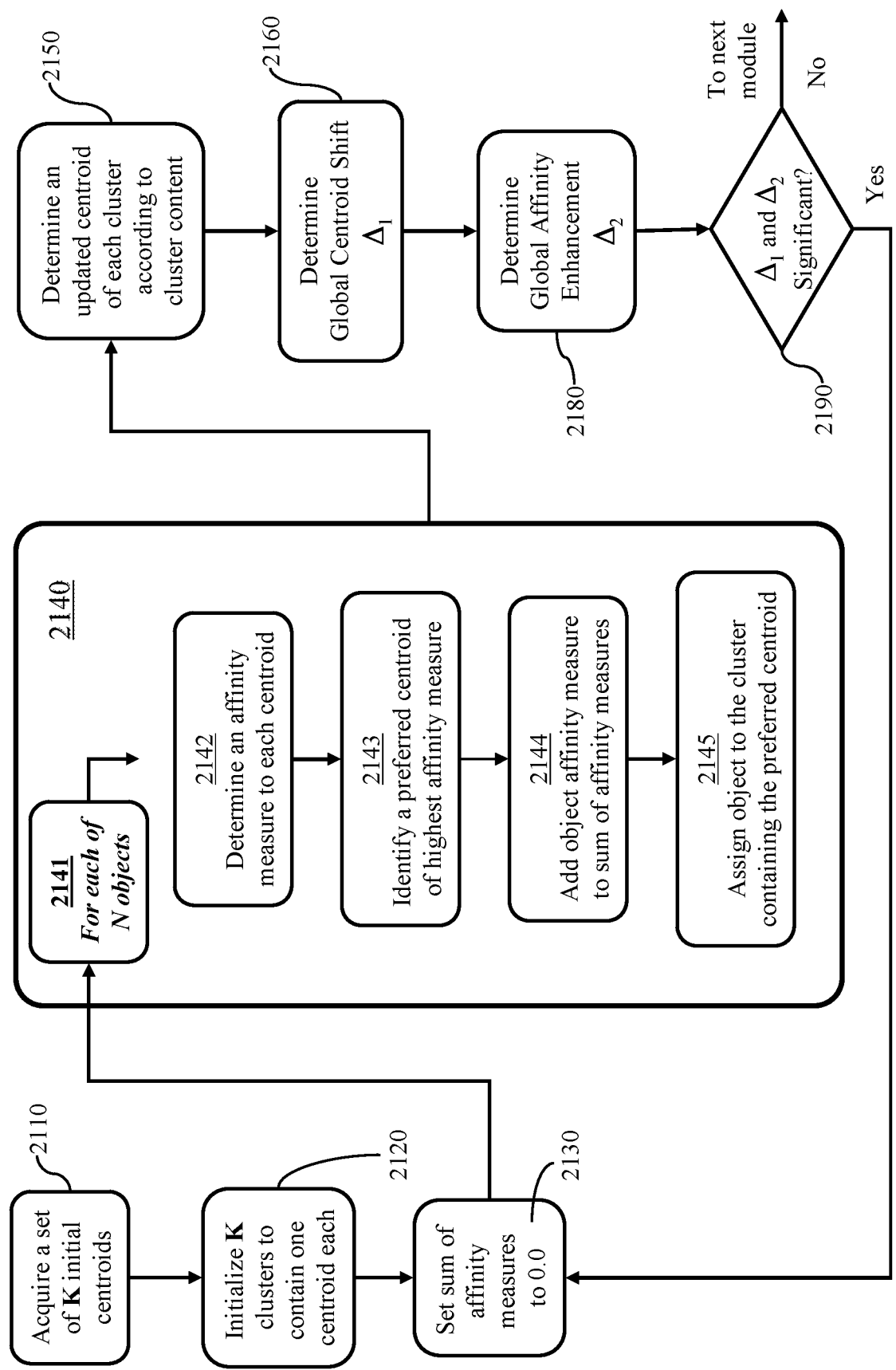
FIG. 21 illustrates a process of generating K primary centroids and determining a Global Affinity Index, in accordance with an embodiment of the present invention.

FIG. 21 illustrates a method of generating K primary centroids and determining a Global Affinity Index. A set of K initial centroids (seed centroids) is acquired (process 2110). The K seeds may be selected at random from array 1710 or—preferably—according to selection rules. A set of K clusters is initialized so that each cluster is assigned one of the K initial centroids (process 2120) and a Global Affinity Index is initialized to equal zero. A sum of affinity measures, to be used for computing the Global Affinity Index, is initialized to equal zero (process 2130).

Process 2140 assigns each of the N tracked objects to one of the centroids based on affinity measures. An object is selected (process 2141) either sequentially or according to a specific order. Process 2142 determines an affinity measure of the selected object to each of the K centroids. An affinity measure may be based on Euclidean proximity of an object to a centroid or angular-displacement of the object from the centroid. Process 2143 identifies a preferred centroid of the K centroids for a selected object. The affinity measure of the selected object is added to the sum of affinity measures (process 2144) and the selected object is added to the cluster corresponding to the preferred centroid (process 2145).

Upon completion of the assignment of each of the N objects to a respective centroid, the vector representing each centroid may be updated to account for the membership of the centroid (process 2150). Updating the centroid vectors after completion of assigning the N objects to clusters requires storing an identifier of the cluster to which each object is assigned. This would be stored in an array of N entries.

A Global Centroid Shift $\Delta_1$ is determined based on comparing updated descriptors of all centroids with corresponding previous descriptors (process 2160). An array of centroid shift, indicating a current and previous value of each centroid is maintained. Initially, the array of centroid shift would contain only the initial K centroids.

If a seeded Angular Clustering process is used, the dot product of a current vector and the previous vector representing the centroid may be used as a measure of centroid shift. If each object is represented by non-negative descriptors 1716, hence non-negative normalized descriptors 1816, the dot product is also non-negative. The index of global Centroid Shift may be determined as the sum of K dot products divided by the number K of centroids.

If a seeded Euclidean clustering process is used, a shift vector may be determined for each of the K centroids. A shift vector of a centroid is the difference between a current vector and a previous vector representing the centroid. The magnitude of the shift vector divided by the larger of the magnitudes of the two vectors is then used as a measure of centroid shift. The index of global Centroid Shift may be determined as the sum of the individual centroid shifts divided by the number K of centroids.

The computed Global Affinity Index $\Delta_2$ is compared with a previous value of the Global Affinity Index (process 2180). If the current value is significantly larger than the previous value and the Index of Global Centroid Shift is larger than a specified threshold, indicating that there is still room for better clustering (process 2190), then process 2140 is repeated after re-initializing the value of the sum of affinity measures (process 2130). After a first execution of process 2140, the previous value of the Global Affinity Index is zero and process 2140 is preferably executed at least twice.

Figure 22:
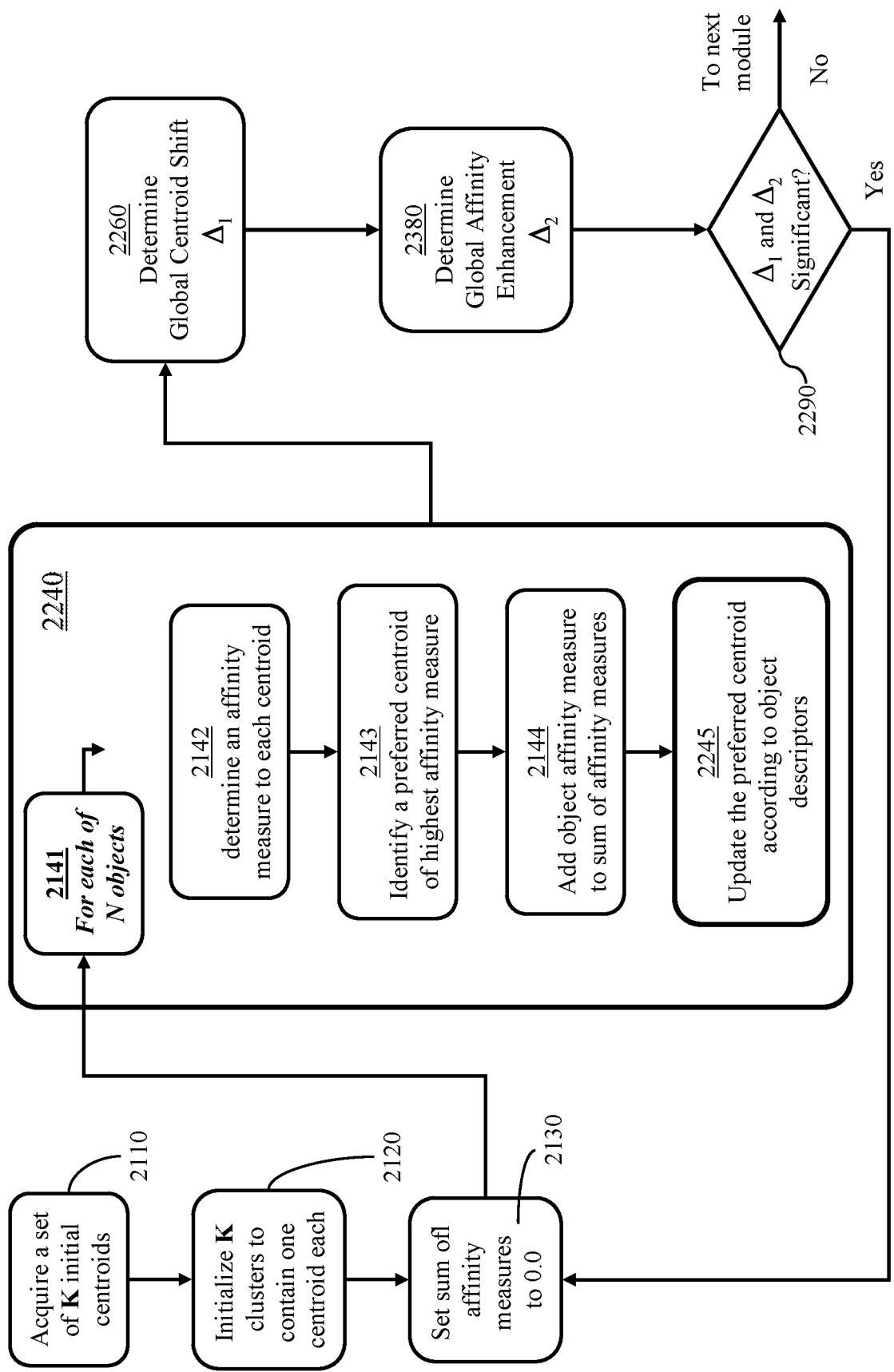
FIG. 22 illustrates an alternate process of generating K primary centroids and determining a Global Affinity Index, in accordance with an embodiment of the present invention.

FIG. 22 illustrates an alternate method of generating K primary centroids and determining a Global Affinity Index. Processes 2110, 2120, and 2130 are similar to those of the method of FIG. 21. Process 2240 assigns each of N objects to one of the centroids based on affinity measures and updates the vector representing a centroid upon the assignment of an object to the cluster corresponding to the centroid (process 2245). In contrast, the counterpart process 2140 updates the vectors representing the centroids only after completion of one round of assigning the N objects. Thus, process 2240 would yield more appropriate object assignments at the expense of additional processing effort. Process 2245 may be modified to update a centroid of a cluster upon the inclusion of a specified number of objects in the cluster. For example, with a number of objects of 1,000,000, a cluster that attracts 5000 objects may be updated 100 times, instead of 5000 times, upon each addition of 50 objects as members of the cluster. Processes 2260, 2280, and 2290 are similar to processes 2160, 2180, and 2190 except that they process outputs of process 2240.

Figure 23:
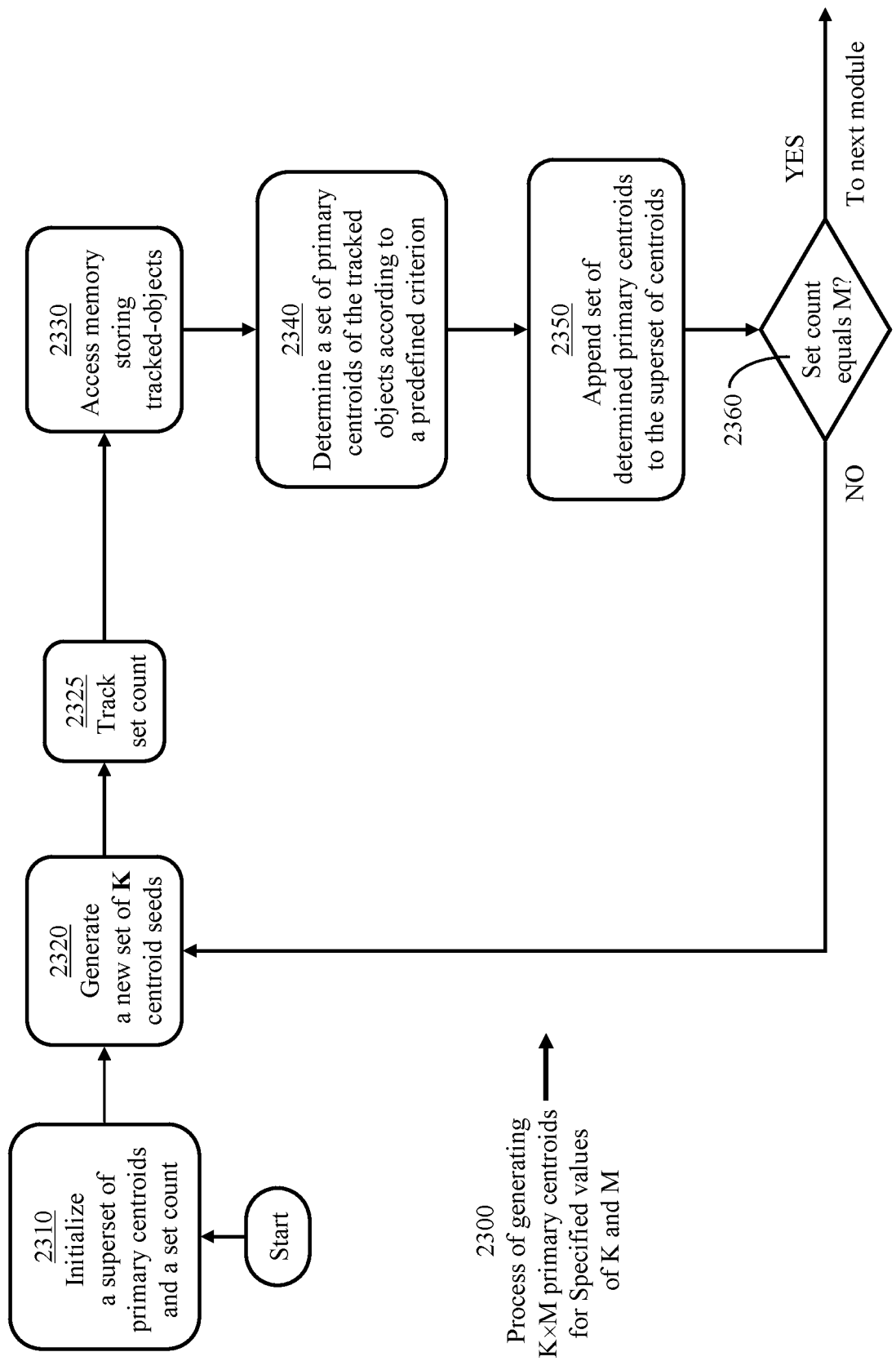
FIG. 23 illustrates a process of generating the M sets of K primary centroids, in accordance with an embodiment of the present invention.

FIG. 23 illustrates a method 2300 of generating a superset of primary centroids comprising M sets each comprising K primary centroids. A set count is initialized as zero and a superset of primary centroids is initialized as an empty set (process 2310). A new set of K centroid seeds is generated (process 2320) to be used for generating one set of K primary centroids. The set count is increased by 1 (step 2325).

A processor accesses a memory device storing array 1710 of v-dimensional vectors 1714 to acquire object data (process 2330). A set of primary centroids is determined (process 2340) according to the method of FIG. 21 or the method of FIG. 22. The set of primary centroids is then added to the superset of centroids (process 2350). When the set count determined in step 2325 reaches the requisite number M, the superset of primary centroids would be fully populated and made available (process 2360) to a subsequent stage of clustering based on the DBSCAN method. Otherwise, when the set count is less than M, process 2320 is revisited to start creating one more set of K primary centroids.

Figure 24:
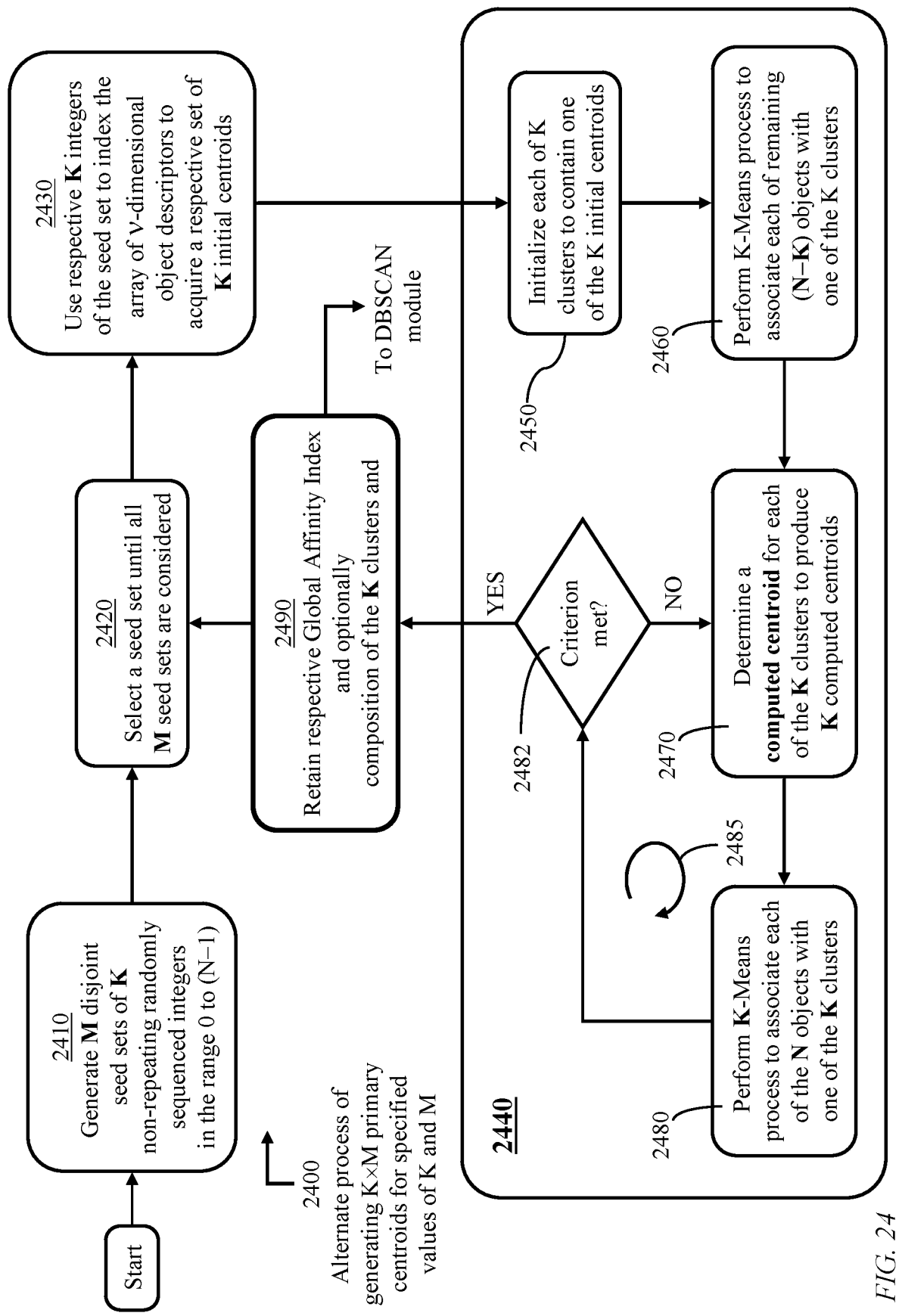
FIG. 24 illustrates an alternate process of generating the M sets of K primary centroids, in accordance with an embodiment of the present invention.

FIG. 24 illustrates an alternate method 2400 of generating the M sets of K primary centroids. Initially, M disjoint sets of K non-repeating randomly sequenced integers in the range of 0 to (N−1) are generated (process 2410) to index array 1710 of the v-dimensional vectors characterizing the tracked objects. A set of K integers is selected (process 2420) subject to a determination that the number of considered centroid-seed sets is less than the specified number M. The K integers are used to index array 1710 to get K descriptor vectors 1714 for use as initial centroids (process 2430). As discussed above with reference to FIG. 19, a descriptor vector 1714 considered to be an outlier is preferably avoided in the selection of initial centroids. Module 2440 is then activated to determine K primary centroids starting with the set of K initial centroids. Each of K clusters is initialized (process 2450) to contain one of the K initial centroids. A module of processor executable instructions for implementing a K-means method is activated (process 2460) to associate each of unassigned (N−K) objects with one of the K clusters according to an affinity measure of each unassigned object to each of the K centroids.

The K centroids are updated (process 2470) to account for the added objects. The centroids may be updated after completion of assigning each object to a respective cluster. Alternatively, a centroid may be updated after a predefine number of objects is added to the cluster containing the centroid. Thus, process 2470 may be activated after completion of process 2460 or during implementation of process 2460.

The K-means module is activated again (process 2480) to associate each of the N objects with the newly computed centroids. A Global Affinity Index and a convergence measure are determined in process 2480. The convergence measure is compared with a predefined convergence criterion. If it is determined that a steady state has been reached (process 2482), the Global Affinity Index together with the v-dimensional vectors representing the K centroids are retained for use as input to the second-stage clustering module. If it is determined that a steady state has not been reached, processes 2470 and 2480 are executed again (loop 2485). Processes 2460 and 2480 are performed using the same module which may also perform process 2470.

Figure 25:
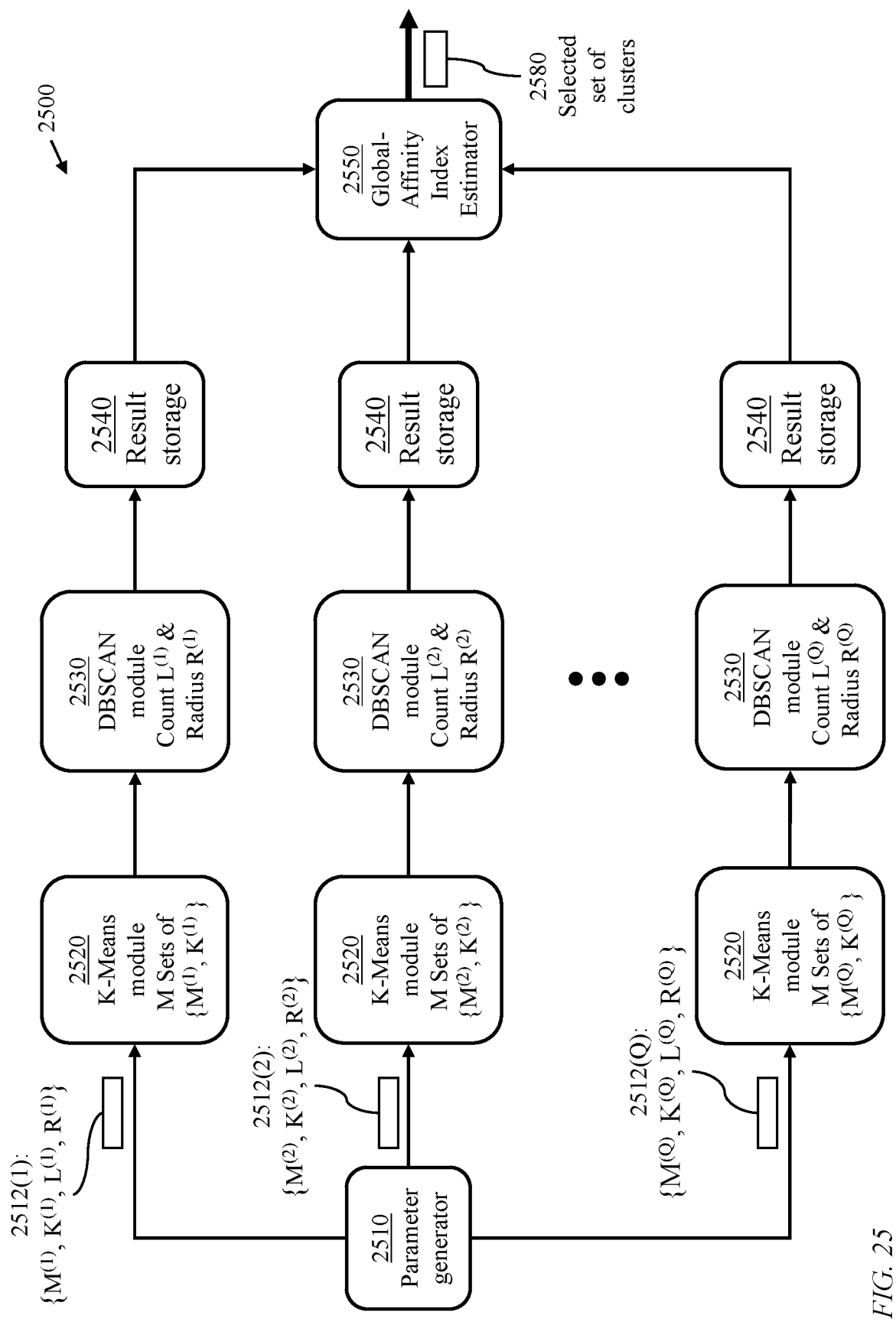
FIG. 25 illustrates a system implementing parallel processes of two-stage clustering for different input-parameter sets, in accordance with an embodiment of the present invention.

FIG. 25 illustrates a parallel-processing arrangement 2500 for concurrent execution of clustering processes using multiple two-stage clustering modules with different input-parameter sets. Preferably, each of the two-stage clustering modules comprises processor-executable instructions stored in a respective memory device coupled to a respective hardware processor. Each module 2520 implements a K-means process for specified values of M and K. Each module 2530 executes a DBSCAN process for specified values of density parameters {Π, R}, where Π is a specified minimum number of primary centroids within a hypersphere of radius R.

Each storage medium 2540 holds data comprising computed centroids and content (object membership) of each cluster defined according a respective DBSCAN module 2530.

A parameter-generation module 2510 generates a number, Q, Q>1, of parameter sets:

$\{M^{(j)}, K^{(j)}, \Pi^{(j)}, R^{(j)}\}$, $1 \leq j \leq Q$,

Each parameter set is directed to one of the two-stage clustering modules. For a two-stage module of index j:

$M^{(j)}$ is a number of centroid sets;

$K^{(j)}$ is a number of centroids per centroid set; and $\Pi^{(j)}$ is a minimum number of primary centroids within a hypersphere of radius $R^{(j)}$;

Parameters $\{M^{(j)}, K^{(j)}\}$, $1 \leq j \leq Q$, are pertinent to K-means modules 2520 and parameters $\{\Pi^{(j)}, R^{(j)}\}$ are pertinent to DBSCAN modules 2530.

A module 2550 determines a Global Affinity Index for each set of clusters produced by a two-stage clustering module and selects the set of clusters of highest Global Affinity Index.

Figure 26:
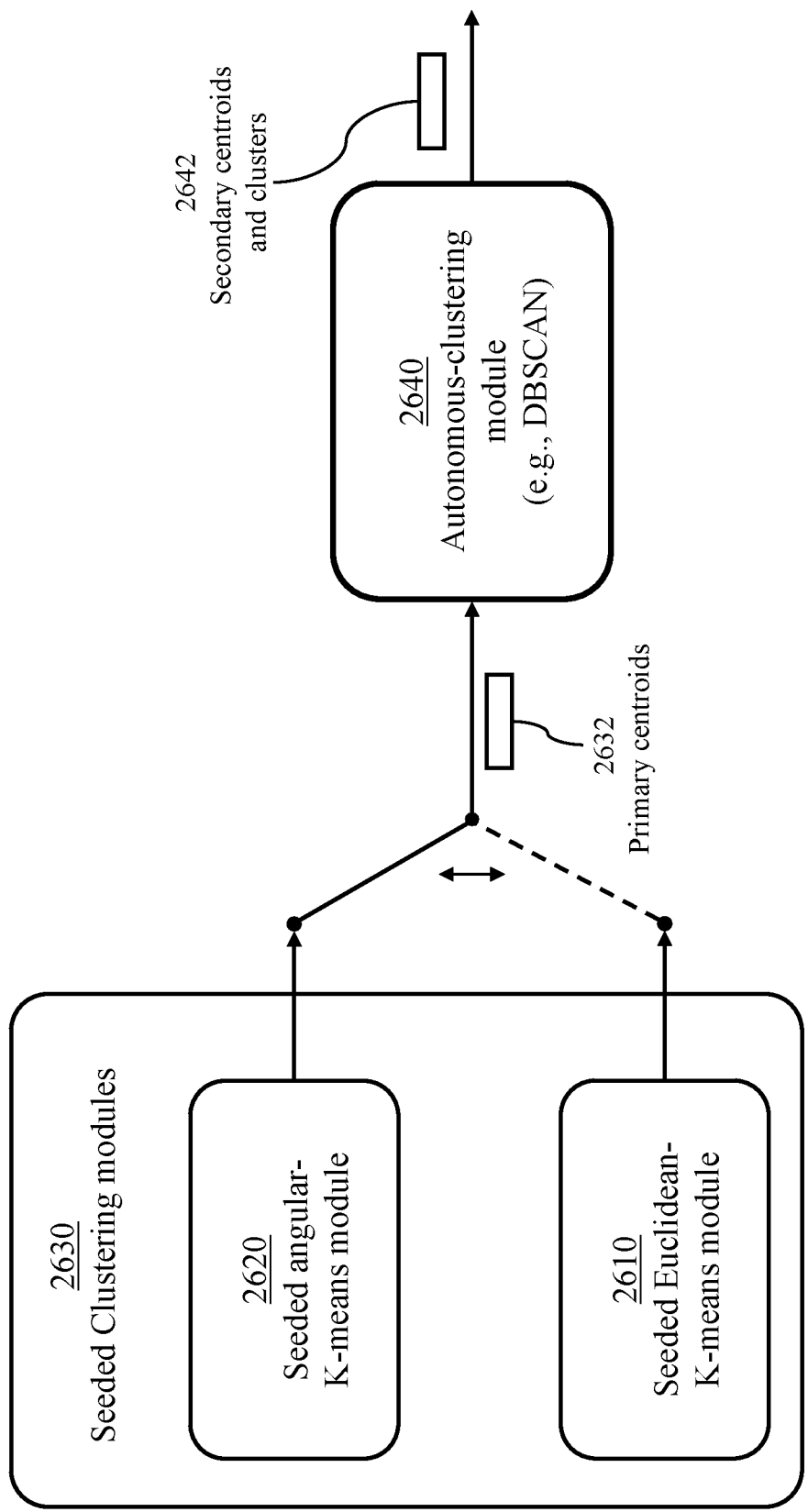
FIG. 26 illustrates a two-stage clustering system in accordance with an embodiment of the present invention.

FIG. 26 illustrates a two-stage clustering system in which a first stage comprises seeded clustering modules 2630 and the second stage comprises an autonomous clustering module 2640. The seeded clustering modules 2630 comprise a seeded Euclidean-K-means module 2610 and a seeded angular-K-means module 2620. Either of the two modules 2610 and 2620 may be used to segment the tracked objects into a number K of primary clusters and determine corresponding K primary centroids 2632. The number K of primary clusters is judicially selected to ensure that the mean number of objects per cluster is statistically significant or to meet other criteria. To produce a sufficient number of primary centroids as input to the second stage, the seeded clustering process (Euclidean or angular) may be executed a number of times, using different seeds, and the union of generated primary centroids is submitted to module 2640 to produce clusters of primary centroids.

Figure 27:
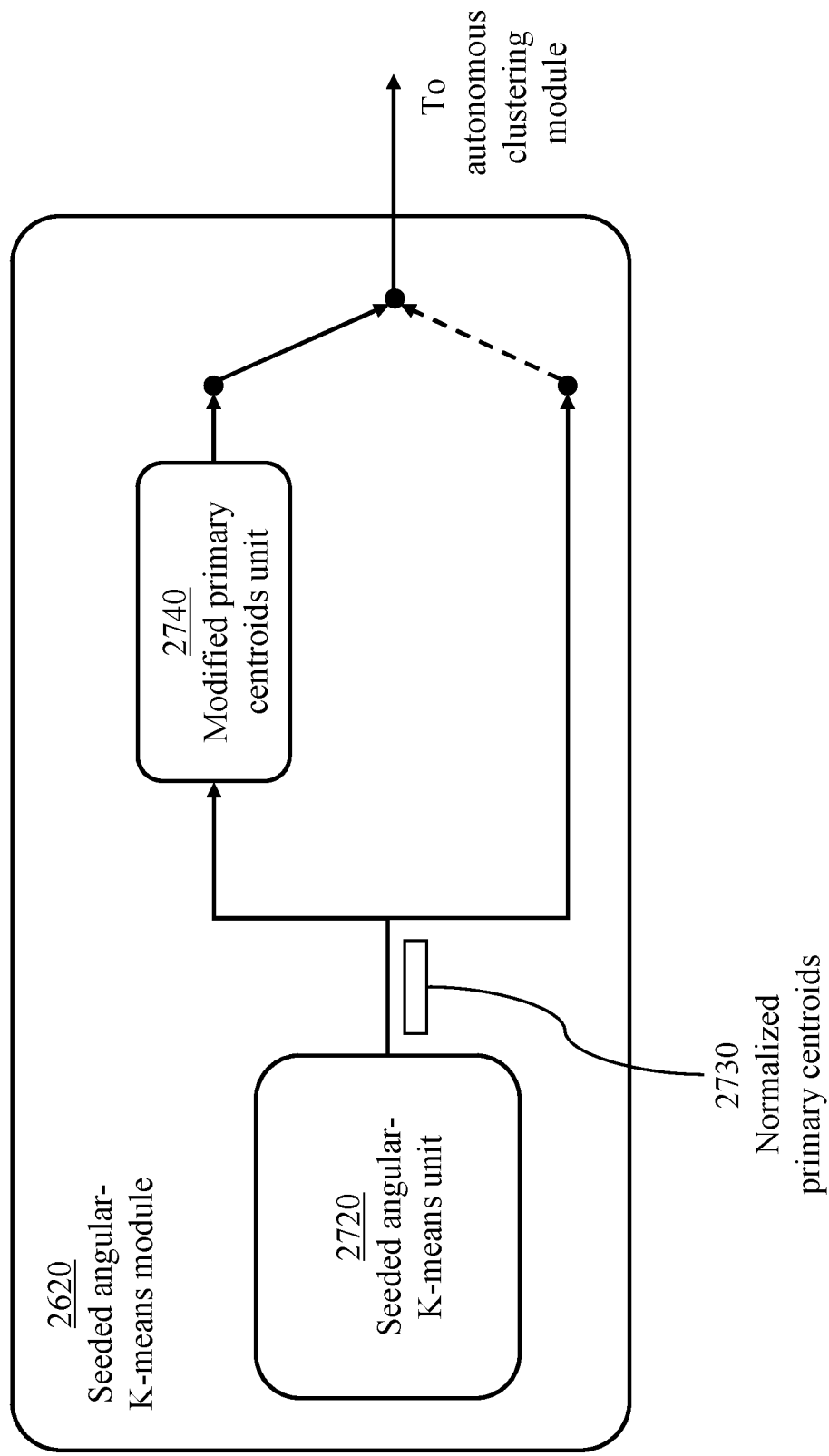
FIG. 27 details a seeded angular-K-means module of the two-stage clustering system of FIG. 26.

FIG. 27 details the seeded angular-K-means module 2620. A seeded angular-K-means unit 2720 determines content (object membership) of each cluster and corresponding normalized primary centroids 2730. The normalized primary centroids 2730 may be submitted directly to the autonomous clustering module. Alternatively, a modified primary centroid may be generated, at the modified primary centroids unit 2740, for each primary cluster based on the object membership of the clusters and array 1710 of the v-dimensional vectors 1714 each representing absolute values of v descriptors of an object, $v \geq 1$. The selection of normalized primary centroids or modified primary centroids is a design option.

Figure 28:
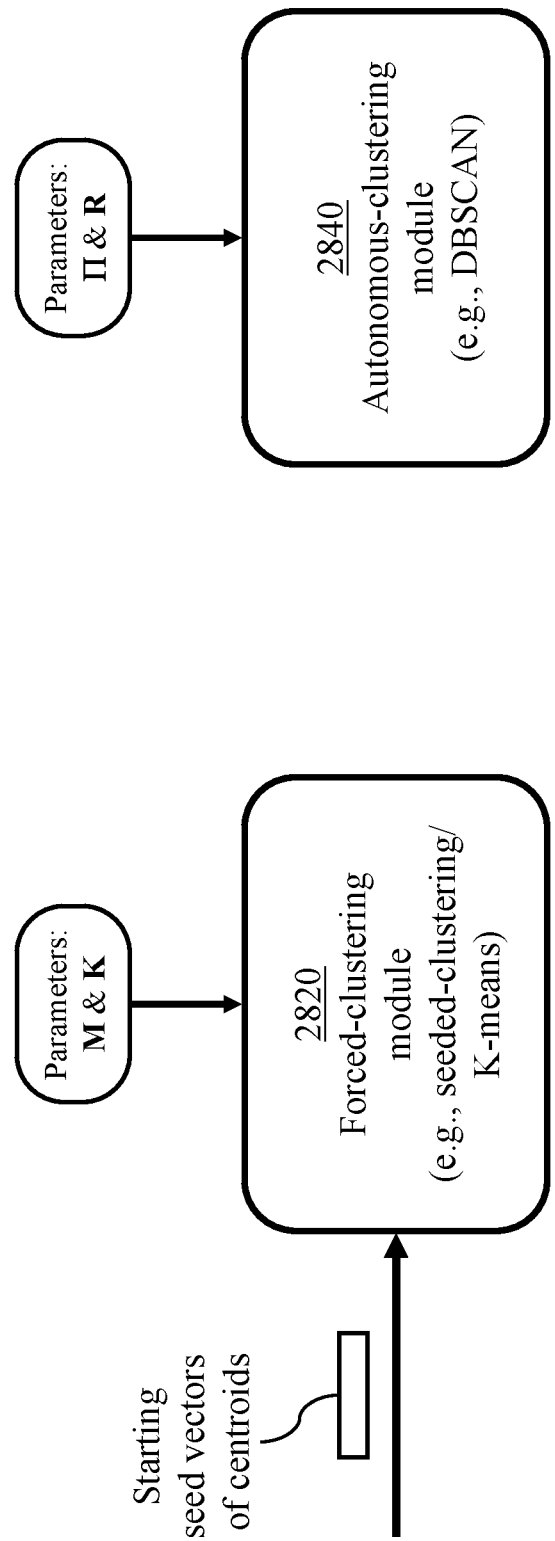
FIG. 28 illustrates a forced-clustering module and an autonomous clustering module.

FIG. 28 illustrates a forced-clustering module 2820 and an autonomous clustering module 2840.

A forced clustering module implements a guided clustering process which starts with an imposed number K of clusters and corresponding seed vectors 2810 of centroid descriptors. The process assigns objects to the clusters and determines refined vectors of centroid descriptors. Independent M sets of K refined vectors of centroid descriptors may be generated and presented to the autonomous clustering module. The values M and K are provided by a (human) user or determined using a parameter generator as illustrated in FIG. 29.

The autonomous clustering module implements a clustering method which identifies cluster based solely on the input data. If the autonomous clustering module is applied directly to the tracked data, its input data would be an array of vectors of object descriptors (1710 or 1810). In the two-stage clustering system of the present invention, the input data to the autonomous clustering module 2840 would be the vectors of primary-centroid descriptors. The DBSCAN implementation of autonomous clustering uses parameters Π and R, defined above, which may be provided by a user or determined using a parameter generator as illustrated in FIG. 29.

Figure 29:
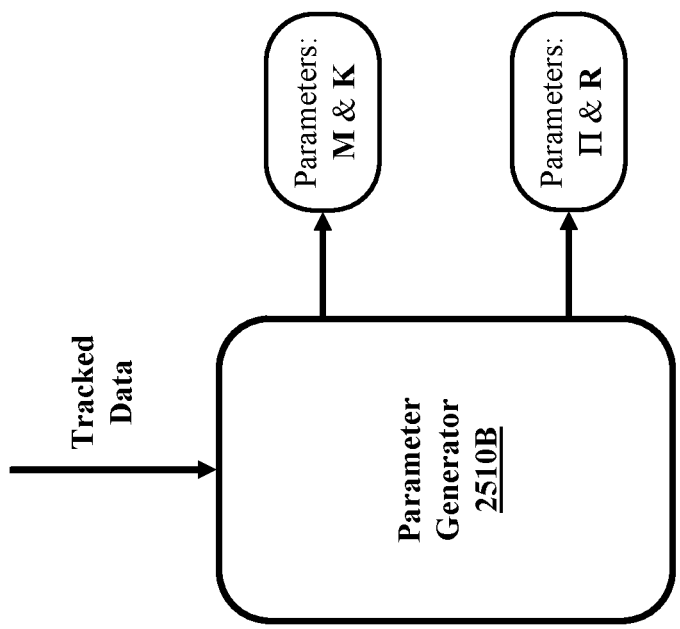
FIG. 29 illustrates two modes of operation of a parameter generator used in the system of FIG. 25.
Figure 29:
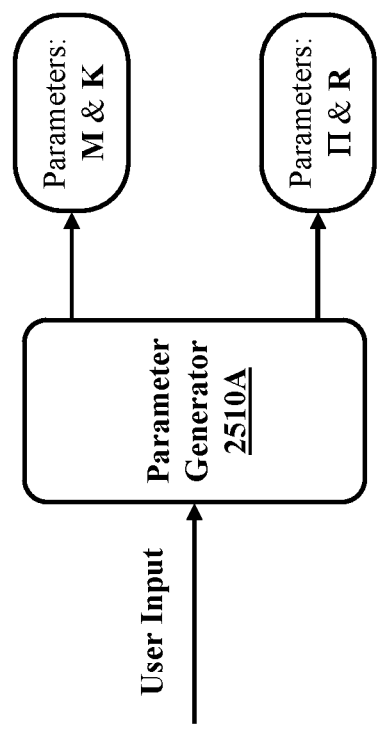

FIG. 29 illustrates two modes of operation of parameter generator 2510 of FIG. 25. In a first mode, a parameter generator 2510A acquires parameters M, K, Π, and R, defined above, from a user. In a second mode, a parameter generator 2510B may analyze the tracked data (array 1710, FIG. 17) and determine appropriate values for parameters M, K, Π, and R.

Figure 30:
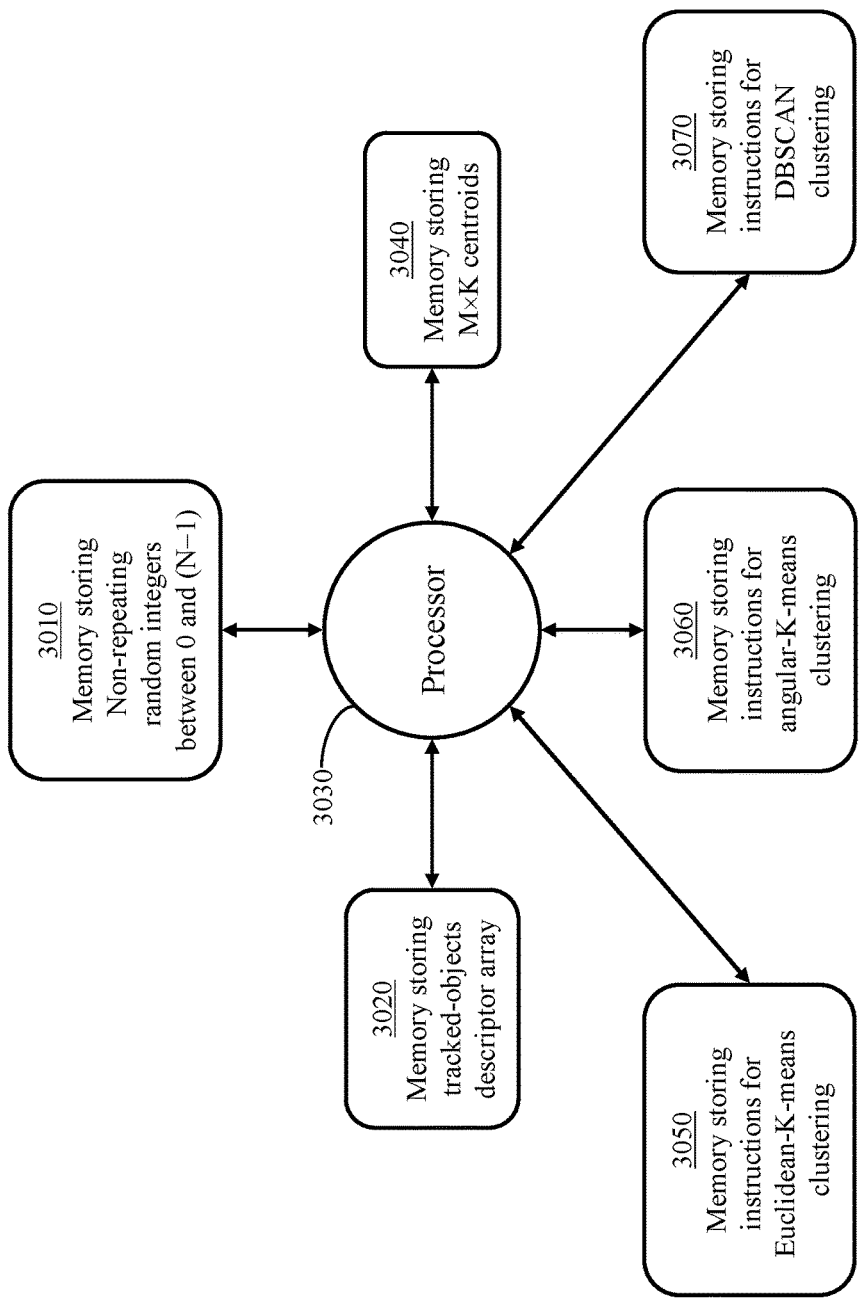
FIG. 30 illustrates an exemplary apparatus for implementing the methods of the present invention.

FIG. 30 illustrates an exemplary apparatus for implementing the methods described above. The apparatus comprises:

a memory device 3010 storing non-repeating randomly sequenced integers to be used for indexing array 1710 to pick vectors of object descriptors to be used as centroid seeds;

a memory device 3020 storing tracked objects data (array 1710);

a processor 3030, which may be an assembly of processing units, a memory device 3040 holding primary centroids to be submitted to a second-stage clustering module;

a memory device 3050 storing processor-executable instructions for implementing Euclidean-K-means clustering process;

a memory device storing processor-executable instructions for implementing angular-K-means clustering process; and a memory device 3070 storing processor-executable instructions for implementing an autonomous clustering process such as the DBSCAN process.

The term "memory device" may refer to an independent storage device, multiple storage devices, or a partition of a storage device.

Two-Stage Clustering Process

Thus, the method of clustering of the present invention comprises processes of:

(i) acquiring and storing a plurality 1710 of vectors 1714 of object descriptors;

(ii) seeded clustering of the plurality of objects as illustrated in FIGS. 5, 21, and 22;

(iii) autonomous clustering 520, 2530, 2640, 2840, 3070 of primary centroids 620, 925, 2632, resulting from seeded clustering to produce a set of secondary clusters 630, 1520, 2642; and (iv) associating each object with one of the secondary clusters 640 as illustrated in FIG. 6 and FIG. 16.

Each vector 1714 of object descriptors characterizes a respective object of the plurality of objects. The process of seeded clustering uses the plurality of vectors of object descriptors and a first affinity measure to produce a plurality of primary centroids 620, 925, 632, 2150, 2245 characterized by a corresponding plurality of vectors of primary descriptors. The process of autonomous clustering 2530, 2640, or 2840 segments the plurality of primary centroids using the plurality of vectors of primary descriptors and a second affinity measure to produce a set of secondary centroids. Finally, each object is associated with one of the secondary centroids as illustrated in FIG. 16, according to the second affinity measure to produce refined clusters of the plurality of objects.

The first affinity measure may be based on angular displacement of each object from each primary centroid. Alternatively, the first affinity measure may be based on Euclidean distance between each object and each primary centroid.

The second affinity measure may be based on object density defined as a number of primary centroids within a hypersphere of a predefined radius. The seeded-clustering process may be performed according to an angular K-means clustering process 2620, 2720, 3060. Alternatively, the seeded-clustering process may be performed according to a Euclidean K-means clustering process 2610, 3050.

The autonomous clustering 2640, 2840 may be performed according to a process of Density-Based Spatial Clustering of Applications with Noise (DBSCAN) based on specified values of density parameters $\{\Pi, R\}$, where $\Pi$ is a specified minimum number of primary centroids within a hypersphere of radius R (FIG. 29).

Rather than specifying a relatively large number of clusters for the seeded clustering process, which may lead to clusters containing relatively small numbers of objects, the process of seeded clustering may be run M times, M>1, with a judicially selected number K of clusters and different sets of K primary centroid seed vectors as illustrated in FIG. 7, FIG. 14, FIG. 23, and FIG. 24. The resulting K primary centroids of each of the M runs are merged to form a superset of M×K primary centroids (FIG. 14, FIG. 15). Thus, the seeded clustering process comprises steps of: generating a superset 2410 of M×K mutually-distinct seed vectors of primary descriptors of the plurality of primary centroids; and segmenting the plurality of objects into respective K clusters for each of M sets of K seed vectors. A primary centroid may be determined for each cluster according to a process of angular K-means clustering process. Alternatively, a primary centroid may be determined for each cluster according to a process of Euclidean K-means clustering process;

The resulting superset of M×K primary centroids (processes 810, 2350, 2490) is retained to be processed in a subsequent autonomous clustering process 2640.

To acquire a set of K seed vectors, objects of the plurality of objects are indexed as 0 to (N−1), N being a number of objects of the plurality of objects, as illustrated in FIG. 17 and FIG. 18) and a set of K indices are generated (process 2410) as non-repeating randomly sequenced integers in the range of 0 to (N−1). The K vectors of object descriptors read from the memory device, corresponding to the K indices, are then used as K seed vectors. Each seed vector is associated with one of K clusters, K>1 and an angular K-means process is performed to determine K centroids of K clusters, K>1. The generated K centroids join a superset of centroids forming the plurality of primary centroids. Generating the set of K centroids is repeated (M−1) times using different sets of K seed vectors, M>1 to produce M×K primary centroids as illustrated in FIG. 7, FIG. 23, and FIG. 24.

In accordance of the embodiments of the present invention, three methods may be use to select appropriate seed vectors to start a seeded clustering process.

According to a first method of seed selection, a lower bound 1724 and an upper bound 1726 of values of each descriptor may be determined; each vector of object descriptors represents a set of ν descriptors of different types, ν>1. K objects are randomly selected subject to a condition that for each of the selected K objects at least a predefined number of descriptors of the ν descriptors have values within the lower bound and upper bound. Vectors of object descriptors of the K objects may be used as the K seed vectors (1720, FIG. 17, FIG. 19).

According to a second method of seed selection, the magnitude of each vector of object descriptors is determined and a cumulative normalized histogram of magnitudes of the vectors of object descriptors is generated. A lower bound 1822 and an upper bound 1824 of the magnitudes are determined according to predefined cumulative values $h_1$ and $h_2$, $h_1 < h_2 < 1.0$. K objects are then randomly selected subject to a condition that for each of the K objects the corresponding magnitude is within the lower bound and upper bound. The vectors of object descriptors of the selected K objects may be used as the K seed vectors.

According to a third method of seed selection, the angular displacement of each vector of object descriptors is determined. A cumulative normalized histogram of angular displacements of the vectors of object descriptors is generated. A lower bound 1826 and an upper bound 1828 of the angular displacements are determined according to predefined cumulative values $h_1$ and $h_2$, $h_1 < h_2 < 1.0$. K objects are then randomly selected subject to a condition that for each of the K objects the corresponding angular displacement is within the lower bound 1826 and upper bound 1828. Vectors of object descriptors of the selected K objects may be used as the K seed vectors.

Apparatus

An apparatus implementing the two-stage clustering process comprises a processor 3030 and at least one memory device. One of the memory devices 3010 stores a plurality of vectors of object descriptors where each vector 1714, 1814 of object descriptors characterizes a respective object of the plurality of objects.

Processor-executable instructions, stored memory devices 3050, 3060, and 3070, are organized into software modules including:

(4) a first module, 2610 or 2620, for clustering the plurality of objects according to the plurality of vectors of object descriptors and a first affinity measure to produce a plurality of primary centroids characterized by a corresponding plurality of vectors of primary descriptors;

(5) a second module 2640, 2840 for clustering the plurality of primary centroids according to the plurality of vectors of primary descriptors and a second affinity measure to produce a set of secondary centroids; and (6) a third module for producing refined clusters of the plurality of objects by associating each object of the plurality of objects with one of the secondary centroids according to the second affinity measure.

The first module is devised to cause the processor to generate M sets of K seed vectors of primary descriptors of the plurality of primary centroids, M≥1, K>1 (750, FIG. 7, FIG. 14, FIG. 20, FIG. 24). The first module (FIG. 27) may compute a plurality of normalized vectors 1814 of object descriptors, for use as input to an angular K-means clustering process, where each vector of the plurality of vectors of object descriptors is normalized to have a magnitude of unity (FIG. 18). For each of the M sets of K seed vectors, the plurality of objects is segmented into respective K clusters. Corresponding K primary centroids are determined according to a process of angular K-means clustering process. The union of M sets of K primary centroids thus determined forms the plurality of primary centroids.

The seeded angular-K-means process determines content (object membership) of each primary cluster and corresponding normalized primary centroids 2730. The normalized primary centroids 2730 may be submitted directly to an autonomous clustering module such as the second module which implements a DBSCAN process. Alternatively, a modified primary centroid may be generated (unit 2740) for each primary cluster based on the object membership of the clusters and the plurality of vectors of absolute values of object descriptors.

The second module 2640, 2840, is devised to implement the Density-Based Spatial Clustering of Applications with Noise based on specified values of density parameters {Π, R}, where Π is a specified minimum number of primary centroids within a hypersphere of radius R.

Parallel-Processing System

Multiple independent apparatus may be operated concurrently with a parameter generator 2510 configured to acquire or generate clustering parameters for each apparatus.

Each apparatus comprises a respective processor and at least one memory device storing processor-executable instructions organized into a first module 2520, a second module 2530, and a third module as described above. Each apparatus produces a set of clusters corresponding to respective clustering parameters and determines a respective Global Affinity Index, storing results in a respective storage medium 2540. A selector 2550 acquires results from storage media 2540 and extracts a set of clusters 2580 of highest Global Affinity Index.

The first module 2520 of each apparatus may be configured to implement an angular K-means clustering process based on a predefined number K of clusters and corresponding seed vectors of primary descriptors. The angular K-means clustering process is exercised M times to produce the plurality of vectors of primary descriptors.

The processes illustrated in FIGS. 2, 4, 5, 7, 8, 21, 22, 23, and 24, as applied to a social graph of a vast population, are computationally intensive requiring the use of multiple hardware processors. A variety of processors, such as microprocessors, digital signal processors, and gate arrays, may be employed. Generally, the processor-readable media of FIG. 3 may include floppy disks, hard disks, optical disks, Flash ROMS, non-volatile ROM, and RAM.

Systems and apparatus of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A method of clustering of a plurality of objects, comprising:
    storing in a memory device a plurality of vectors of object descriptors, each vector of object descriptors characterizing a respective object of said plurality of objects; and
    employing a hardware processor coupled to said memory device to perform:
        seeded clustering of said plurality of objects according to said plurality of vectors of object descriptors and a first affinity measure to produce a plurality of primary centroids characterized by a corresponding plurality of vectors of primary descriptors;
        autonomous clustering of said plurality of primary centroids according to said plurality of vectors of primary descriptors and a second affinity measure to produce a set of secondary centroids; and
        associating each object of said plurality of objects with one of said secondary centroids according to proximity to produce refined clusters of said plurality of objects;
    said plurality of primary centroids containing M×K primary centroids, M≥1, K>1, and said seeded clustering comprising:
        generating a superset of M×K mutually-distinct seed vectors of primary descriptors of said plurality of primary centroids;
        for each of M sets of K seed vectors, segmenting said plurality of objects into respective K clusters and determining corresponding K primary centroids according to a process of K-means clustering; and
        storing resulting superset of M×K primary centroids.

2. The method of claim 1 wherein said first affinity measure is based on angular displacement of each said object from each said primary centroid.

3. The method of claim 1 wherein said first affinity measure is based on Euclidean distance between each said object and each said primary centroid.

4. The method of claim 1 wherein said second affinity measure is based on object density defined as a number of primary centroids within a hypersphere of a predefined radius.

5. The method of claim 1 wherein said K-means clustering is an angular K-means clustering.

6. The method of claim 1 wherein said K-means clustering is a Euclidean K-means clustering.

7. The method of claim 1 further comprising performing said autonomous clustering according to a process of Density-Based Spatial Clustering of Applications with Noise based on specified values of density parameters {Π, R}, where Π is a specified minimum number of primary centroids within a hypersphere of radius R.

8. The method of claim 1 wherein said segmenting comprises:
    initializing each cluster of a set of K clusters to contain a respective vector of centroid descriptors;
    computing a respective displacement of said each object to said each cluster according to a vector of object descriptors of said each object and said respective vector of centroid descriptors of said each cluster;
    assigning said each object to a cluster of least displacement;
    and
    upon assignment of all objects of said plurality of objects:
        updating each cluster's vector of centroid descriptors according to current assignment of objects to clusters; and
        repeating said computing and said assigning until a predefined completion criterion is attained.

9. The method of claim 1 wherein said segmenting comprises:
    initializing each cluster of a set of K clusters to contain a respective vector of centroid descriptors;
    for each object of said plurality of objects:
        computing a respective displacement to said each cluster according to a vector of object descriptors of said each object and said respective vector of centroid descriptors of said each cluster;
        assigning said each object to a preferred cluster of least displacement;
        and
        updating said preferred cluster's vector of centroid descriptors.

10. A method of clustering of a plurality of objects, comprising:
    storing in a memory device a plurality of vectors of object descriptors, each vector of object descriptors characterizing a respective object of said plurality of objects; and
    employing a hardware processor coupled to said memory device to perform:
        seeded clustering of said plurality of objects according to said plurality of vectors of object descriptors and a first affinity measure to produce a plurality of primary centroids characterized by a corresponding plurality of vectors of primary descriptors;
        autonomous clustering of said plurality of primary centroids according to said plurality of vectors of primary descriptors and a second affinity measure to produce a set of secondary centroids; and
        associating each object of said plurality of objects with one of said secondary centroids according to proximity to produce refined clusters of said plurality of objects;
    wherein said seeded clustering comprises:
        acquiring a set of K seed vectors and associating each seed vector with one of clusters, K>1;
        executing an angular K-means clustering process to determine K centroids of K clusters;
        inserting said K centroids in a superset of centroids forming said plurality of primary centroids; and
        repeating said acquiring, executing, and inserting (M−1) times using different sets of K seed vectors, M>1.

11. The method of claim 10 wherein said acquiring comprises:
    indexing objects of said plurality of objects as 0 to (N−1), N being a number of objects of said plurality of objects;
    generating a set of K indices as non-repeating randomly sequenced integers in the range of 0 to (N−1); and
    using K vectors of object descriptors, read from said memory device, corresponding to said K indices as said K seed vectors.

12. The method of claim 10 further comprising:
    determining a lower bound and an upper bound of values of each descriptor, each said vector of object descriptors representing a set of ν descriptors of different types, ν>1;
    randomly selecting K objects subject to a condition that for each of said K objects at least a predefined number of descriptors of said ν descriptors have values within said lower bound and upper bound; and
    using vectors of object descriptors of said K objects as said K seed vectors.

13. The method of claim 10 further comprising:
    determining a magnitude of said each vector of object descriptors;
    generating a cumulative normalized histogram of magnitudes of said vectors of object descriptors;
    determining a lower bound and an upper bound of said magnitudes according to predefined cumulative values $h_1$ and $h_2$, $h_1 < h_2 < 1.0$;
    randomly selecting K objects subject to a condition that for each of said K objects the corresponding magnitude is within said lower bound and upper bound; and
    using vectors of object descriptors of said K objects as said K seed vectors.

14. The method of claim 10 further comprising:
    determining an angular displacement of said each vector of object descriptors;
    generating a cumulative normalized histogram of angular displacements of said vectors of object descriptors;
    determining a lower bound and an upper bound of said angular displacements according to predefined cumulative values $h_1$ and $h_2$, $h_1 < h_2 < 1.0$;
    randomly selecting K objects subject to a condition that for each of said K objects the corresponding angular displacement is within said lower bound and upper bound; and
    using vectors of object descriptors of said K objects as said K seed vectors.

15. An apparatus for clustering a plurality of objects comprising:
    a processor and at least one memory device storing:
        a plurality of vectors of object descriptors, each vector of object descriptors characterizing a respective object of said plurality of objects; and
        processor-executable instructions organized into:
            a first module for clustering said plurality of objects according to said plurality of vectors of object descriptors and a first affinity measure to produce a plurality of primary centroids characterized by a corresponding plurality of vectors of primary descriptors;
            a second module for clustering said plurality of primary centroids according to said plurality of vectors of primary descriptors and a second affinity measure to produce a set of secondary centroids; and
            a third module for producing refined clusters of said plurality of objects by associating each object of said plurality of objects with one of said secondary centroids according to said second affinity measure;

wherein execution of said first module causes said processor to:

generate M sets of K seed vectors of primary descriptors of said plurality of primary centroids, M−1, K>1;

for each of the M sets of K seed vectors, segment said plurality of objects into respective K clusters and determine corresponding K primary centroids according to a K-means clustering process;

determine said plurality of primary centroids as the union of M sets of K primary centroids thus determined.

16. The apparatus of claim 15 wherein said processor-executable instructions pertinent to said second module implement a Density-Based Spatial Clustering of Applications with Noise based on specified values of density parameters {Π, R}, where Π is a specified minimum number of primary centroids within a hypersphere of radius R.

17. A system for clustering a plurality of objects comprising:

a plurality of independent apparatus, each apparatus comprising a respective processor and at least one memory device storing processor-executable instructions organized into:

a first module for clustering a plurality of objects characterized by a plurality of vectors of object descriptors based on a first affinity measure to produce a plurality of primary centroids characterized by a corresponding plurality of vectors of primary descriptors, said first module configured to:

implement a K-means clustering process based on a predefined number K of clusters and corresponding seed vectors of primary descriptors, K>1; and execute said K-means clustering process M times to produce said plurality of vectors of primary descriptors, M>1;

a second module for clustering said plurality of primary centroids according to said plurality of vectors of primary descriptors and a second affinity measure, based on specified values of density parameters {Π, R}, where Π is a specified minimum number of primary centroids within a hypersphere of radius R, to produce a set of secondary centroids; and a third module for associating each object of said plurality of objects with one of said secondary centroids to produce a respective set of secondary clusters and determining a respective Global Affinity Index;

a parameter generator configured to:

acquire for said each apparatus:

respective values of K, M, R and Π; and

M×K seed vectors of primary descriptors;

direct said respective values of K and M, and M×K seed vectors, to a respective first module; and direct said respective values of R and Π to a respective second module; and a selector of a set of secondary clusters of highest Global Affinity Index.

18. The system of claim 17 wherein said third module determines said Global Affinity Index according to deviation of each object of said plurality of objects from a respective secondary centroid.

19. The method of claim 15 further comprising selecting said K-means clustering as an angular K-means clustering.

20. The method of claim 15 further comprising selecting said K-means clustering as a Euclidean K-means clustering.

21. The system of claim 17 wherein said K-means clustering is an angular K-means clustering.

22. The system of claim 17 wherein said K-means clustering is a Euclidean K-means clustering.

23. The system of claim 17 wherein the second module is configured to implement a Density-Based Spatial Clustering.

* * * * *